US011483864B2

(12) United States Patent
Xue et al.

(10) Patent No.: US 11,483,864 B2
(45) Date of Patent: Oct. 25, 2022

(54) AUTONOMOUS SIDELINK OVER UNLICENSED BAND

(71) Applicant: QUALCOMM INCORPORATED, San Diego, CA (US)

(72) Inventors: Yisheng Xue, San Diego, CA (US); Chih-Hao Liu, San Diego, CA (US); Xiaoxia Zhang, San Diego, CA (US); Jing Sun, San Diego, CA (US); Yongbin Wei, La Jolla, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 17/090,357

(22) Filed: Nov. 5, 2020

(65) Prior Publication Data

US 2021/0195637 A1    Jun. 24, 2021

Related U.S. Application Data

(60) Provisional application No. 62/951,956, filed on Dec. 20, 2019.

(51) Int. Cl.
*H04W 74/08* (2009.01)
*H04W 16/14* (2009.01)
*H04W 92/18* (2009.01)

(52) U.S. Cl.
CPC ....... *H04W 74/0808* (2013.01); *H04W 16/14* (2013.01); *H04W 92/18* (2013.01)

(58) Field of Classification Search
CPC .. H04L 27/0006; H04W 16/14; H04W 16/16; H04W 72/04; H04W 72/12; H04W 74/002; H04W 74/0808; H04W 74/0816–0825; H04W 76/14; H04W 84/18; H04W 92/18
See application file for complete search history.

(56) References Cited

U.S. PATENT DOCUMENTS

| | | | |
|---|---|---|---|
| 2022/0131725 A1* | 4/2022 | Li | H04L 27/0006 |
| 2022/0159724 A1* | 5/2022 | Fan | H04W 74/0866 |
| 2022/0167407 A1* | 5/2022 | Oviedo | H04W 74/0808 |
| 2022/0174720 A1* | 6/2022 | Yang | H04L 1/18 |

* cited by examiner

*Primary Examiner* — Thomas R Cairns
(74) *Attorney, Agent, or Firm* — Haynes and Boone, LLP

(57) ABSTRACT

Wireless communications systems and methods related to autonomous sidelink communication in a shared radio frequency band (e.g., in a shared spectrum or an unlicensed spectrum) are provided. A first user equipment (UE) performs a listen-before-talk (LBT) in a shared radio frequency band during at least a portion of a first sidelink frame. The first UE determines a channel occupancy time (COT) in the shared radio frequency band based on the LBT. A beginning of the COT is within the first sidelink frame and offset from a boundary of the first sidelink frame. The COT includes one or more sidelink frames subsequent to the first sidelink frame. The first UE transmits, in the shared radio frequency band, a COT indication signal at the beginning of the COT within the first sidelink frame. The COT indication signal includes COT sharing information for UEs to share the one or more sidelink frames.

30 Claims, 14 Drawing Sheets

AUTONOMOUS SIDELINK OVER UNLICENSED BAND

CROSS REFERENCE TO RELATED APPLICATIONS

The present application claims priority to and the benefit of U.S. Provisional Patent Application No. 62/951,956, filed Dec. 20, 2019, which is hereby incorporated by reference in its entirety as if fully set forth below and for all applicable purposes.

TECHNICAL FIELD

This application relates to wireless communication systems, and more particularly to autonomous sidelink communication in a shared radio frequency band (e.g., in a shared spectrum or an unlicensed spectrum) shared by multiple network operating entities with flexible listen-before-talk (LBT) gaps and channel occupancy time (COT) sharing.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications for D2D, V2X, and/or C-V2X over a dedicated spectrum, a licensed spectrum, and/or an unlicensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes including performing, by a first user equipment (UE), a listen-before-talk (LBT) in a shared radio frequency band during at least a portion of a first sidelink frame; determining, by the first UE, a channel occupancy time (COT) in the shared radio frequency band based on the LBT, where a beginning of the COT is within the first sidelink frame and offset from a boundary of the first sidelink frame, and where the COT includes one or more sidelink frames subsequent to the first sidelink frame; and transmitting, by the first UE in the shared radio frequency band, a COT indication signal at the beginning of the COT within the first sidelink frame, where the COT indication signal includes COT sharing information for UEs to share the one or more sidelink frames.

In an additional aspect of the disclosure, a method of wireless communication includes receiving, by a first user equipment (UE), a channel occupancy time (COT) indication signal in a shared radio frequency band, where a beginning of the COT indication signal is within a first sidelink frame and offset from a boundary of the first sidelink frame, and where the COT indication signal indicates one or more sidelink frames subsequent to the first sidelink frame for sharing; and transmitting, by the first UE to a second UE, a first sidelink communication including SCI and sidelink data during a second sidelink frame of the one or more sidelink frames based on the COT indication signal.

In an additional aspect of the disclosure, an apparatus includes a processor configured to perform listen-before-talk (LBT) in a shared radio frequency band during at least a portion of a first sidelink frame; and determine a channel occupancy time (COT) in the shared radio frequency band based on the LBT, where a beginning of the COT is within the first sidelink frame and offset from a boundary of the first sidelink frame, and where the COT includes one or more sidelink frames subsequent to the first sidelink frame; and a transceiver configured to transmit, in the shared radio frequency band, a COT indication signal at the beginning of the COT within the first sidelink frame, where the COT indication signal includes COT sharing information for UEs to share the one or more sidelink frames.

In an additional aspect of the disclosure, an apparatus includes a transceiver configured to receive a channel occupancy time (COT) indication signal in a shared radio frequency band, where a beginning of the COT indication signal is within a first sidelink frame and offset from a boundary of the first sidelink frame, and where the COT indication signal indicates one or more sidelink frames subsequent to the first sidelink frame for sharing; and transmit, to a second UE, a first sidelink communication including SCI and sidelink data during a second sidelink frame of the one or more sidelink frames based on the COT indication signal.

In an additional aspect of the disclosure, a non-transitory computer-readable medium having program code recorded thereon, the program code includes code for causing a first user equipment (UE) to perform listen-before-talk (LBT) in a shared radio frequency band during at least a portion of a first sidelink frame; code for causing the first UE to determine a channel occupancy time (COT) in the shared radio frequency band based on the LBT, where a beginning of the COT is within the first sidelink frame and offset from a boundary of the first sidelink frame, and where the COT includes one or more sidelink frames subsequent to the first sidelink frame; and code for causing the first UE to transmit, in the shared radio frequency band, a COT indication signal at the beginning of the COT within the first sidelink frame, where the COT indication signal includes COT sharing information for UEs to share the one or more sidelink frames.

In an additional aspect of the disclosure, a non-transitory computer-readable medium having program code recorded thereon, the program code including code for causing a first user equipment (UE) to receive a channel occupancy time (COT) indication signal in a shared radio frequency band, where a beginning of the COT indication signal is within a first sidelink frame and offset from a boundary of the first sidelink frame, and where the COT indication signal indicates one or more sidelink frames subsequent to the first sidelink frame for sharing; and code for causing the first UE to transmit, to a second UE, a first sidelink communication including SCI and sidelink data during a second sidelink frame of the one or more sidelink frames based on the COT indication signal.

In an additional aspect of the disclosure, an apparatus including means for performing listen-before-talk (LBT) in a shared radio frequency band during at least a portion of a first sidelink frame; means for determining a channel occupancy time (COT) in the shared radio frequency band based on the LBT, where a beginning of the COT is within the first sidelink frame and offset from a boundary of the first sidelink frame, and where the COT includes one or more sidelink frames subsequent to the first sidelink frame; and means for transmitting, in the shared radio frequency band, a COT indication signal at the beginning of the COT within the first sidelink frame, where the COT indication signal includes COT sharing information for UEs to share the one or more sidelink frames.

In an additional aspect of the disclosure, an apparatus including means for receiving a channel occupancy time (COT) indication signal in a shared radio frequency band, where a beginning of the COT indication signal is within a first sidelink frame and offset from a boundary of the first sidelink frame, and where the COT indication signal indicates one or more sidelink frames subsequent to the first sidelink frame for sharing; and means for transmitting, to a second UE, a first sidelink communication including SCI and sidelink data during a second sidelink frame of the one or more sidelink frames based on the COT indication signal.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
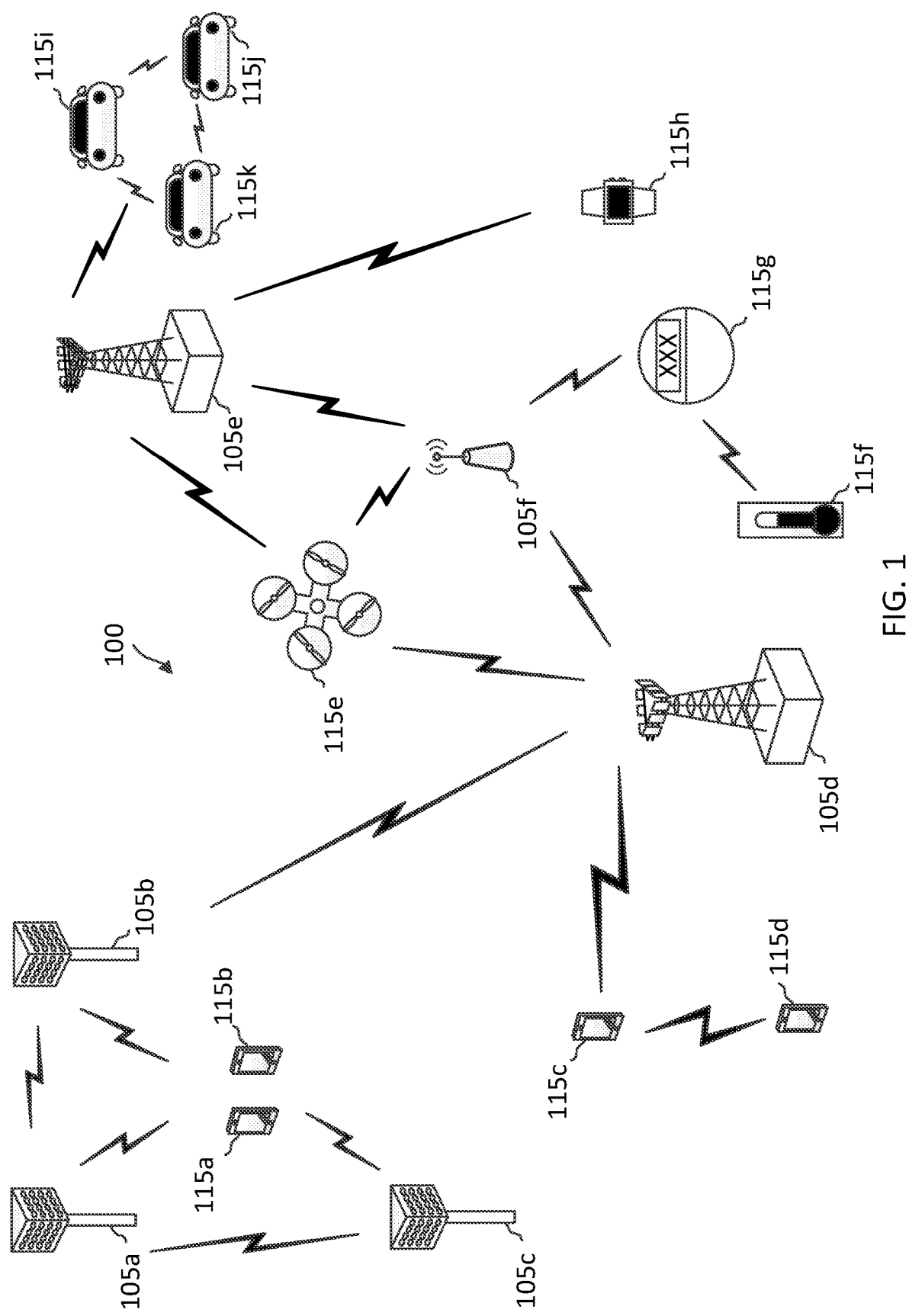
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include vehicle-to-everything (V2X), industrial IoT (IIoT), and/or NR-lite.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS may determine a radio resource on behalf of a sidelink UE and transmit an indication of the radio resource to the sidelink UE. The mode-2 RRA supports autonomous RRA that can be used for out-of-coverage sidelink UEs or partial-coverage sidelink UEs. For instance, an out-of-coverage sidelink UE or a partial-coverage UE may be preconfigured with a sidelink resource pool and may select a radio resource from the preconfigured sidelink resource pool for sidelink communication.

The deployment of NR over an unlicensed spectrum is referred to as NR-unlicensed (NR-U). Some studies have been conducted for NR-U deployment over 5 gigahertz (GHz) unlicensed bands. Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Sidelink can benefit from utilizing the additional bandwidth available in unlicensed spectrum.

The present application describes mechanisms for sidelink UEs to perform autonomous sidelink communications over a shared radio frequency band (e.g., in a shared radio spectrum or an unlicensed spectrum) and to coexist with other technologies (e.g., WiFi, LAA) that may use a load based equipment (LBE) channel access scheme. In some aspects, a sidelink system may utilize SCI monitoring or sensing to handle intra-technology or intra-system collisions (among sidelink UEs of the same system) and may utilize listen-before-talk (LBT) to handle inter-technology collisions for coexistence with other technologies. The shared radio frequency band may be partitioned into multiple subchannels or frequency subbands. A sidelink UE may be configured to operate in a mode-2 RRA. For instance, the sidelink UE may be configured with a resource pool in the shared radio frequency band. The resource pool may include a plurality of sidelink frames in the shared radio frequency band. Each sidelink frame may span multiple frequency subbands in the shared radio frequency band and may include a sidelink resource in each frequency subband. The sidelink frames can be contiguous in time. A sidelink transmission (e.g., SCI and/or sidelink data) may start at the boundary of a sidelink frame and may be within a frequency subband. The sidelink system may configure one or more UEs with a facilitator role to contend for COTs in the shared radio frequency band based on LBE-like LBTs with flexible LBT gaps. The facilitator UEs may share acquired COTs with other sidelink UEs in the system. A facilitator UE may or may not access the shared radio frequency band during its own COT. The other sidelink UEs may monitor for COT sharing opportunities for sidelink transmissions and reuse the current NR sidelink framework for sidelink resource reservations via SCI and intra-system collisions handling via SCI sensing.

In some aspects, a sidelink UE may be configured to operate as a facilitator UE. The sidelink UE may contend for a COT in the shared radio frequency band by performing an LBT in the shared radio frequency band. The LBT may be a category 4 (CAT4) LBT with random backoff and a variable contention window size. In some instances, the sidelink UE may perform the LBT in units of a LBT subband size within the share radio frequency band, for example, based on regulations. For instance, a 5 GHz unlicensed band may have a LBT subband size of about 20 MHz based on regulations. The sidelink UE may start the LBT any time and may perform the LBT during at least a portion of a first sidelink frame. The sidelink UE may determine a COT in the shared frequency band based on passing the LBT. The COT may begin at the time when the LBT passes, for example, within the first sidelink frame and offset from a boundary of the first sidelink frame. The COT may include one or more sidelink frames subsequent to the first sidelink frame. The sidelink UE may transmit a COT indication signal at the beginning of the COT within the first sidelink frame. The COT indication signal may include COT sharing information for other sidelink UEs in the sidelink system to share the one or more sidelink frames in the COT. Some examples of COT sharing information may include the number of sidelink frames, the number of frequency subbands, a COT starting time, a COT ending time, and/or an LBT mode for the sidelink UEs to transmit in the COT. The COT indication signal may also be referred to as a COT declaration signal or an extended SCI signal. In some aspects, the sidelink UE may determine a time instance for transmitting the COT indication signal based on a channel busy ratio (CBR) value, a duration of the COT, and/or a number of LBT failures associated with LBTs performed at predetermine starting points. In some aspects, the COT indications signal transmitted during the first sidelink frame can potentially impact or interfere an on-going sidelink transmission in the first sidelink frame. Thus, the facilitator sidelink UE may perform SCI sensing in the first sidelink frame and determine whether an LBT can be performed to occupy the shared frequency band in the first sidelink frame based on the SCI sensing.

In some aspects, a sidelink UE, which may or may not be a facilitator UE, may monitor for a COT indication signal in the shared radio frequency band. Upon detecting a COT indication signal indicating sharing information for a COT, the sidelink UE may transmit in the COT based on the COT sharing information. In some instances, when the COT sharing information indicates an LBT mode, the sidelink UE may determine perform an LBT prior to transmitting a sidelink transmission based on the LBT mode. In some aspects, the sidelink UE may perform a CAT4 LBT to acquire for a COT in the share radio frequency band concurrent with the COT indication signal monitoring. If the CAT4 LBT passes, the sidelink UE may transmit in the shared radio frequency band during its own COT and terminate the COT indication signal monitoring. If the sidelink UE detected a COT indication signal, the sidelink UE may transmit in the COT indicated by the COT indication signal and terminate the CAT4 LBT. If the sidelink UE fails the CAT4 LBT and fails to detect a COT indication signal, the sidelink UE may refrain from accessing shared radio frequency band.

In some aspects, a sidelink transmission in a last sidelink frame within a COT may be shortened to provide an LBT gap for a sidelink frame subsequent to the COT. In other words, a COT may end before the start of a next sidelink frame. In some aspects, a COT indication signal may indicate that a last sidelink frame of a COT is shortened to provide an LBT gap. A sidelink UE transmitting in the last sidelink frame may shorten the duration of the sidelink transmission based on the COT indication signal. In some aspects, the amount of time leave for the LBT gap at the end of the last sidelink frame may depend on the priority of the sidelink transmission in the last sidelink frame and/or a CBR value. Thus, the disclosed aspects may provide a COT with a floating end time.

Aspects of the present disclosure can provide several benefits. For example, the provisions of flexible LBT gaps, floating COT start time, and/or floating COT end time for sidelink communications can provide sidelink UEs using an NR sidelink frame structure to have a fair chance in contending for a channel shared with other technologies that use LBE-based LBT. The use of one or more facilitator UEs to contend for COTs in the shared channel and share acquired COTs with other sidelink UEs can allow other sidelink UEs to monitor for COT sharing and resue the current NR sidelink framework for sidelink communication. The addition of the SCI sensing in determining whether an LBT may be performed in a sidelink frame can improve the sidelink UE's sensing or LBT sensitivity to avoid potential hidden nodes. For instance, the transmission of the COT indication signal in a sidelink frame after an LBT pass can potentially impact other sidelink transmission in the sidelink frame. While the present disclosure is described in the context of deploying autonomous sidelink communication over a 5 GHz unlicensed band, the disclosed aspects can be applied to any suitable shared or unlicensed band (e.g., at 6 GHz).

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may support sidelink communication among the UEs 115 over a shared radio frequency band (e.g., in a shared spectrum or an unlicensed spectrum). In some aspects, the UEs 115 may communicate with each other over a 5 GHz unlicensed band or a 6 GHz unlicensed band, which may be shared by multiple network operating entities using various radio access technologies (RATs) such as NR-U, WiFi, and/or licensed-assisted access (LAA) as shown in FIG. 2.

Figure 2:
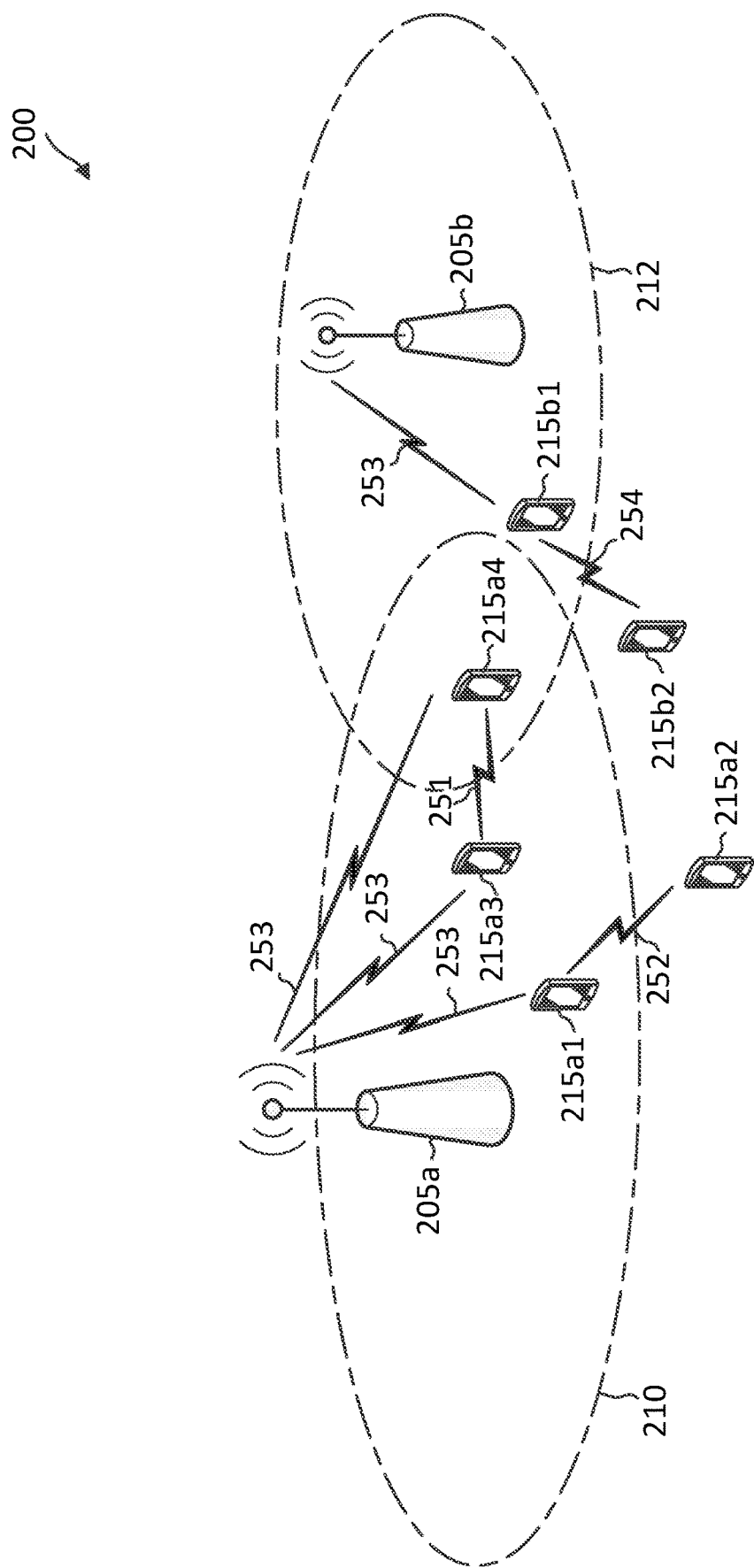
FIG. 2 illustrates a wireless communication network that provisions for sidelink communications according to some aspects of the present disclosure.

FIG. 2 illustrates an example of a wireless communication network 200 that provisions for sidelink communications according to aspects of the present disclosure. The network 200 may correspond to a portion of the network 100. FIG. 2 illustrates two BSs 205 (shown as 205*a* and 205*b*) and six UEs 215 (shown as 215*a*1, 215*a*2, 215*a*3, 215*a*4, 215*b*1, and 215*b*2) for purposes of simplicity of discussion, though it will be recognized that aspects of the present disclosure may scale to any suitable number of UEs 215 (e.g., the about 2, 3, 4, 5, 7 or more) and/or BSs 205 (e.g., the about 1, 3 or more). The BS 205 and the UEs 215 may be similar to the BSs 105 and the UEs 115, respectively. The BSs 205 and the UEs 215 may share the same radio frequency band for communications. In some instances, the radio frequency band may be a 2.4 GHz unlicensed band, a 5 GHz unlicensed band, or a 6 GHz unlicensed band. In general, the shared radio frequency band may be at any suitable frequency.

The BS 205*a* and the UEs 215*a*1-215*a*4 may be operated by a first network operating entity. The BS 205*b* and the UEs 215*b*1-215*b*2 may be operated by a second network operating entity. In some aspects, the first network operating entity may utilize a same RAT as the second network operating entity. For instance, the BS 205*a* and the UEs 215*a*1-215*a*4 of the first network operating entity and the BS 205*b* and the UEs 215*b*1-215*b*2 of the second network operating entity are NR-U devices. In some other aspects, the first network operating entity may utilize a different RAT than the second network operating entity. For instance, the BS 205*a* and the UEs 215*a*1-215*a*4 of the first network operating entity may utilize NR-U technology while the BS 205*b* and the UEs 215*b*1-215*b*2 of the second network operating entity may utilize WiFi or LAA technology.

In the network 200, some of the UEs 215*a*1-215*a*4 may communicate with each other in peer-to-peer communications. For example, the UE 215*a*1 may communicate with the UE 215*a*2 over a sidelink 252, the UE 215*a*3 may communicate with the UE 215*a*4 over another sidelink 251, and the UE 215*b*1 may communicate with the UE 215*b*2 over yet another sidelink 254. The sidelinks 251, 252, and 254 are unicast bidirectional links. Some of the UEs 215 may also communicate with the BS 205*a* or the BS 205*b* in a UL direction and/or a DL direction via communication links 253. For instance, the UE 215*a*1, 215*a*3, and 215*a*4 are within a coverage area 210 of the BS 205*a*, and thus may be in communication with the BS 205*a*. The UE 215*a*2 is outside the coverage area 210, and thus may not be in direct communication with the BS 205*a*. In some instances, the UE 215*a*1 may operate as a relay for the UE 215*a*2 to reach the BS 205*a*. Similarly, the UE 215*b*1 is within a coverage area 212 of the BS 205*b*, and thus may be in communication with the BS 205*b* and may operate as a relay for the UE 215*b*2 to reach the BS 205b. In some aspects, some of the UEs 215 are associated with vehicles (e.g., similar to the UEs 115i-k) and the communications over the sidelinks 251, 252, and 254 may be C-V2X communications. C-V2X communications may refer to communications between vehicles and any other wireless communication devices in a cellular network.

As discussed above, NR supports an autonomous RRA in mode-2 for sidelink. In the current NR sidelink framework, sidelink UEs may indicate sidelink resource reservations via SCI. Intra-technology, intra-operator sidelink collisions (among NR sidelink UEs) are controlled via SCI sensing. The intra-technology, intra-operator side collisions can further be controlled by applying CBR-based and/or CR-based techniques as discussed in greater detail herein. One approach to deploying NR-U sidelink over a shared frequency band or an unlicensed band (e.g., at 5 GHz or 6 GHz) is to reuse the NR sidelink framework and inserts LBT gaps into the NR sidelink framework as shown in FIG. 3.

Figure 3:
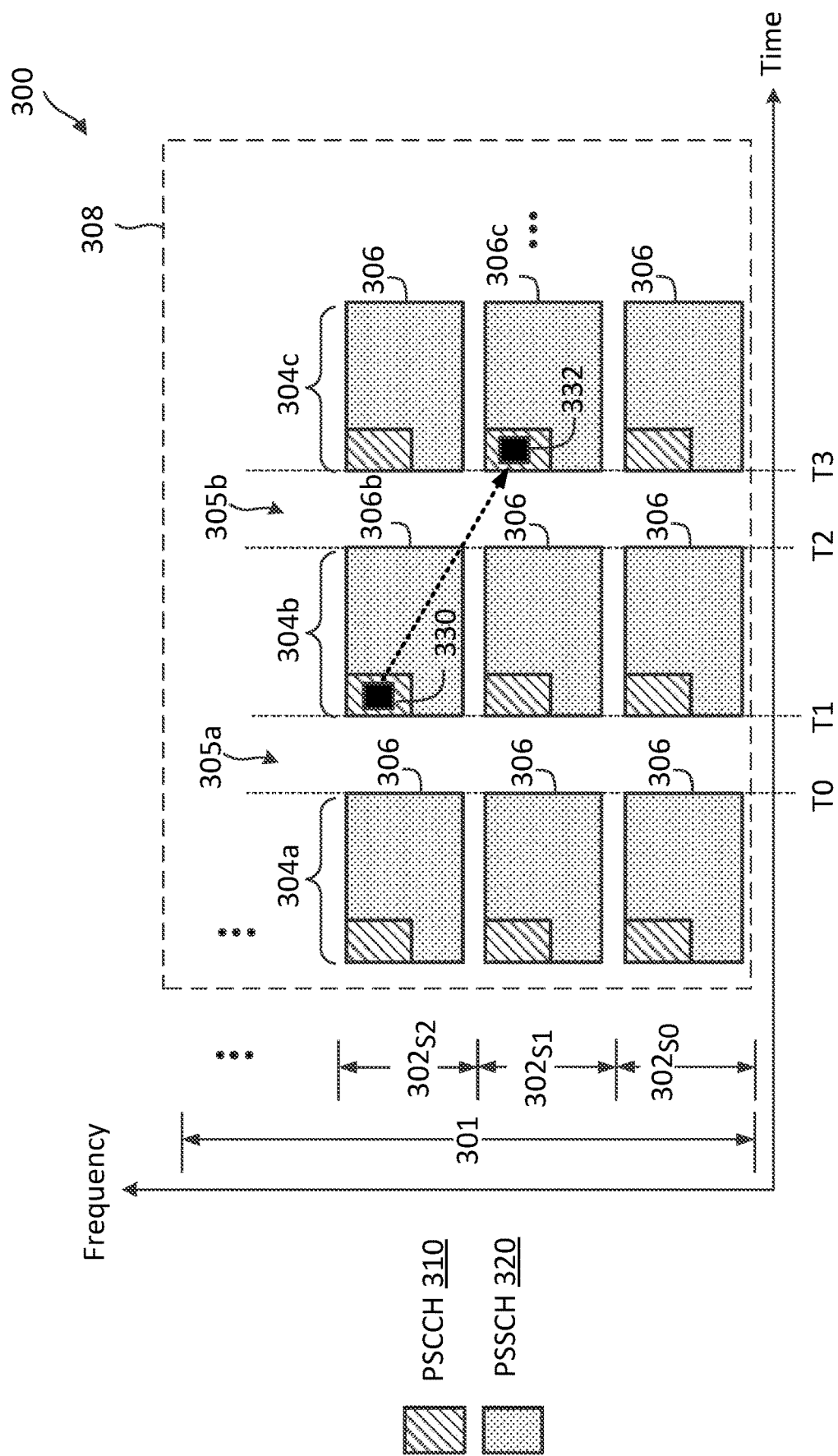
FIG. 3 illustrates a sidelink communication scheme with predetermined listen-before-talk (LBT) gaps according to some aspects of the present disclosure.

FIG. 3 illustrates a sidelink communication scheme 300 with predetermined LBT gaps according to some aspects of the present disclosure. The scheme 300 may be employed by UEs such as the UEs 115 and/or 215 in a network such as the networks 100 and/or 200. In particular, sidelink UEs may employ the scheme 300 to communicate sidelink over a shared radio frequency band (e.g., in a shared spectrum or an unlicensed spectrum). The shared radio frequency band may be shared by multiple RATs as discussed in FIG. 2. In FIG. 3, the x-axis represents time in some arbitrary units, and the y-axis represents frequency in some arbitrary units.

In scheme 300, a shared radio frequency band 301 is partitioned into a plurality of subchannels or frequency subbands 302 (shown as $302_{S0}$, $302_{S1}$, $302_{S2}$, . . . ) in frequency and a plurality of sidelink frames 304 (shown as 304a, 304b, 304c, . . . ) in time for sidelink communication. The frequency band 301 may be at any suitable frequencies (e.g., at about 2.4 GHz, 5 GHz, or 6 GHz). The frequency band 301 may have any suitable BW and may be partitioned into any suitable number of frequency subbands 302. The number of frequency subbands 302 can be dependent on the sidelink communication BW requirement. In some aspects, the frequency band 301 is a 20 MHz band in a 5 GHz unlicensed spectrum and may be partitioned into about four 5 MHz frequency subbands 302.

Each sidelink frame 304 includes a sidelink resource 306 in each frequency subband 302. In some instances, there can be a frequency gap or guard band between adjacent frequency subbands 302 as shown in FIG. 3, for example, to mitigate adjacent band interference. The sidelink resource 306 may have a substantially similar structure as an NR sidelink resource. For instance, the sidelink resource 306 may include a number of subcarriers or RBs in frequency and a number of symbols in time. In some instances, the sidelink resource 306 may have a duration between about one millisecond (ms) to about 20 ms. Each sidelink resource 306 may include a PSCCH 310 and a PSSCH 320. The PSCCH 310 and the PSSCH 320 can be multiplexed in time and/or frequency. In the illustrated example of FIG. 3, for each sidelink resource 306, the PSCCH 310 is located during the beginning symbol(s) (e.g., about 1 symbol or about 2 symbols) of the sidelink resource 306 and occupies a portion of a corresponding frequency subband 302, and the PSSCH 320 occupies the remaining time-frequency resources in the sidelink resource 306. In some instances, a sidelink resource 306 may also include a physical sidelink feedback channel (PSFCH), for example, located during the ending symbol(s) of the sidelink resource 306. In general, a PSCCH 310, a PSSCH 320, and/or a PSFCH may be multiplexed in any suitable configuration within a sidelink resource 306.

The PSCCH 310 can be used for carrying SCI. The PSSCH 320 can be used for carrying sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, HARQ ACK/NACK for sidelink data received in an earlier sidelink resource 306

In an NR sidelink frame structure, the sidelink frames 304 in a resource pool 308 may be contiguous in time. In the scheme 300, a BS (e.g., the BSs 105 and/or 205) may configure UEs in a sidelink system to insert LBT gaps 305 between adjacent sidelink frames 304 to allow time for a sidelink UE to perform an LBT prior to transmitting in a subsequent sidelink resource 306. The LBT gaps 305 are shown as 305a and 305b. In some aspects, the LBT gaps 305 may have a predetermined duration aligned to boundaries of the sidelink frames 304. As shown in FIG. 3, an LBT gap 305a is inserted between the end of the sidelink frame 304a (e.g., at time T0) and the start of the next sidelink frame 304b (e.g., at time T1), and another LBT gap 305b is inserted between the end of the sidelink frame 304b (e.g., at time T2) and the start of the next sidelink frame 304c (e.g., at time T3).

A sidelink UE (e.g., the UEs 115 and/or 215) intending to transmit in the frequency band 301 may perform an LBT in the frequency band 301 during an LBT gap 305. The LBT may be an energy detection-based CAT4 LBT as discussed above with reference to FIG. 1. If the LBT is a pass (e.g., when the measured channel signal energy is below an energy detection threshold), the sidelink UE may proceed to transmit a sidelink transmission to a peer sidelink UE in a sidelink resource 306 of a following sidelink frame 304b. If the LBT fails (e.g., when the measured channel signal energy is above the energy detection threshold), the sidelink UE may refrain from transmitting in the frequency band 301 during the next sidelink frame 304b. As such, the LBT can operate to gate access or occupancy in a frequency subband $302_{S2}$ and to facilitate coexistence with other technologies sharing the frequency band 301.

In the illustrated example of FIG. 3, the sidelink UE passes an LBT in the LBT gap 305a and transmits a sidelink transmission in a sidelink resource 306b located at the frequency subbands $302_{S2}$ during the sidelink frame 304b. The sidelink transmission may include SCI 330 and sidelink data. The SCI is transmitted via the PSCCH 310 of the sidelink resource 306b. The sidelink data is transmitted via the PSSCH 320 of the sidelink resource 306b.

The sidelink UE can include, in the SCI 330, a reservation for a sidelink resource 306 in a later sidelink frame 304. Thus, an intra-NR sidelink UE (e.g., a UE in the same NR-U sidelink system) may perform SCI sensing to determine whether a sidelink resource 306 is available or occupied for intra-NR sharing. For instance, if the intra-NR sidelink UE detected SCI indicating a reservation for a sidelink resource 306, the intra-NR sidelink UE may refrain from transmitting in the reserved sidelink resource 306. If the intra-NR sidelink UE determines that there is no reservation detected for a sidelink resource 306, the intra-NR sidelink UE may transmit in the sidelink resource 306. As such, SCI sensing can assist a UE in identifying a target frequency subband 302 to reserve for sidelink communication and to avoid collision (e.g., intra-NR collision) with another sidelink UE in the NR sidelink system. In some aspects, the intra-NR sidelink UE may be configured with a sensing window for SCI sensing or monitoring to reduce intra-NR collision.

In some aspects, the sidelink UE may be configured with a frequency hopping pattern. In this regard, the sidelink UE may hop from one frequency subband 302 in one sidelink frame 304 to another frequency subband 302 in another sidelink frame 304. In the illustrated example of FIG. 3, during the sidelink frame 304b, the sidelink UE transmits SCI 330 in the sidelink resource 306b located in the frequency subband $302_{S2}$ to reserve a sidelink resource 306c in a next sidelink frame 304c located at the frequency subband $302_{S1}$. The sidelink UE may perform an LBT during the LBT gap 305b in the frequency subband $302_{S1}$ before the sidelink frame 304c. If the LBT is a pass, the sidelink UE may transmit SCI 332 (e.g., to reserve a next sidelink resource 306 in the sidelink resource pool 308), and sidelink data in the sidelink resource 306c.

The SCI can also indicate scheduling information and/or a destination identifier (ID) identifying a target receiving sidelink UE for the next sidelink resource 306. Thus, a sidelink UE may monitor SCI transmitted by other sidelink UEs. Upon detecting SCI in a sidelink resource 306, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 304 in different frequency subband (e.g., via FDM). For instance, in the sidelink frame 304b, one pair of sidelink UEs may communicate sidelink data using a sidelink resource 306 in the frequency subband $302_{S2}$ while another pair of sidelink UEs may communicates sidelink data using a sidelink resource 306 in the frequency subband $302_{S1}$.

In some aspects, the scheme 300 is used for synchronous sidelink communication. In other words, the sidelink UEs are synchronized in time and are aligned in terms of symbol boundary, sidelink resource boundary (e.g., the starting time of sidelink frames 304). The sidelink UEs may perform synchronization in a variety of forms, for example, based on sidelink SSBs received from a sidelink UE and/or NR-U SSBs received from a BS (e.g., the BSs 105 and/or 205) while in-coverage of the BS. In some aspects, the sidelink UE may be preconfigured with the resource pool 308 in the frequency band 301, for example, while in a coverage of a serving BS. The resource pool 308 may include a plurality of sidelink resources 306. The BS can configure the sidelink UE with a resource pool configuration indicating resources in the frequency band 301 and/or the subbands 302 and/or timing information associated with the sidelink frames 304 and/or the LBT gap 305.

The used of predetermined LBT gaps 305 in the scheme 300 is similar to a frame based equipment (FBE) channel access where LBTs are performed at fixed time instants. While the FBE-like scheme 300 may allow for deployment of NR-U sidelink over an unlicensed band, sidelink UEs employing the scheme 300 may have a disadvantage in terms of channel access when other devices sharing the same channel uses a load based equipment (LBE) channel access scheme. In LBE channel access, a node may perform an LBT at any time instant and may perform a backoff upon detecting that the channel is busy. In FBE channel access, a node is restricted to performing LBT at predetermined time instants that are fixed or semi-static. If the LBT fails, the FBE node backs off for a fixed duration until the next predetermined time instant. As such, when an FBE node is surrounded by LBE nodes, an LBE node may have a greater chance in occupying the channel before the FBE node has a chance to perform an LBT. Thus, the FBE node may not have a fair chance in sharing the channel with LBE nodes.

Accordingly, the present disclosure provides techniques for NR-U sidelink UEs configured with a mode-2 RRA to perform LBE-like LBT (e.g., with a flexible LBT gap or LBT starting time) for sidelink communication over a shared radio frequency band (in a shared spectrum or an unlicensed spectrum) and to coexist with other technologies in the shared radio frequency band. In some aspects, an NR-U sidelink system may utilize one or more sidelink UEs to operate as facilitators to contend for COTs in the shared radio frequency band based on LBE-like LBTs. The facilitator UEs may share acquired COTs with other sidelink UEs in the system. The other sidelink UEs may monitor for COT sharing opportunities and reuse the current NR sidelink framework for sidelink communication, where SCI may be used to indicate sidelink resource reservations and SCI sensing may be used to control intra-system sidelink collisions.

Figure 4:
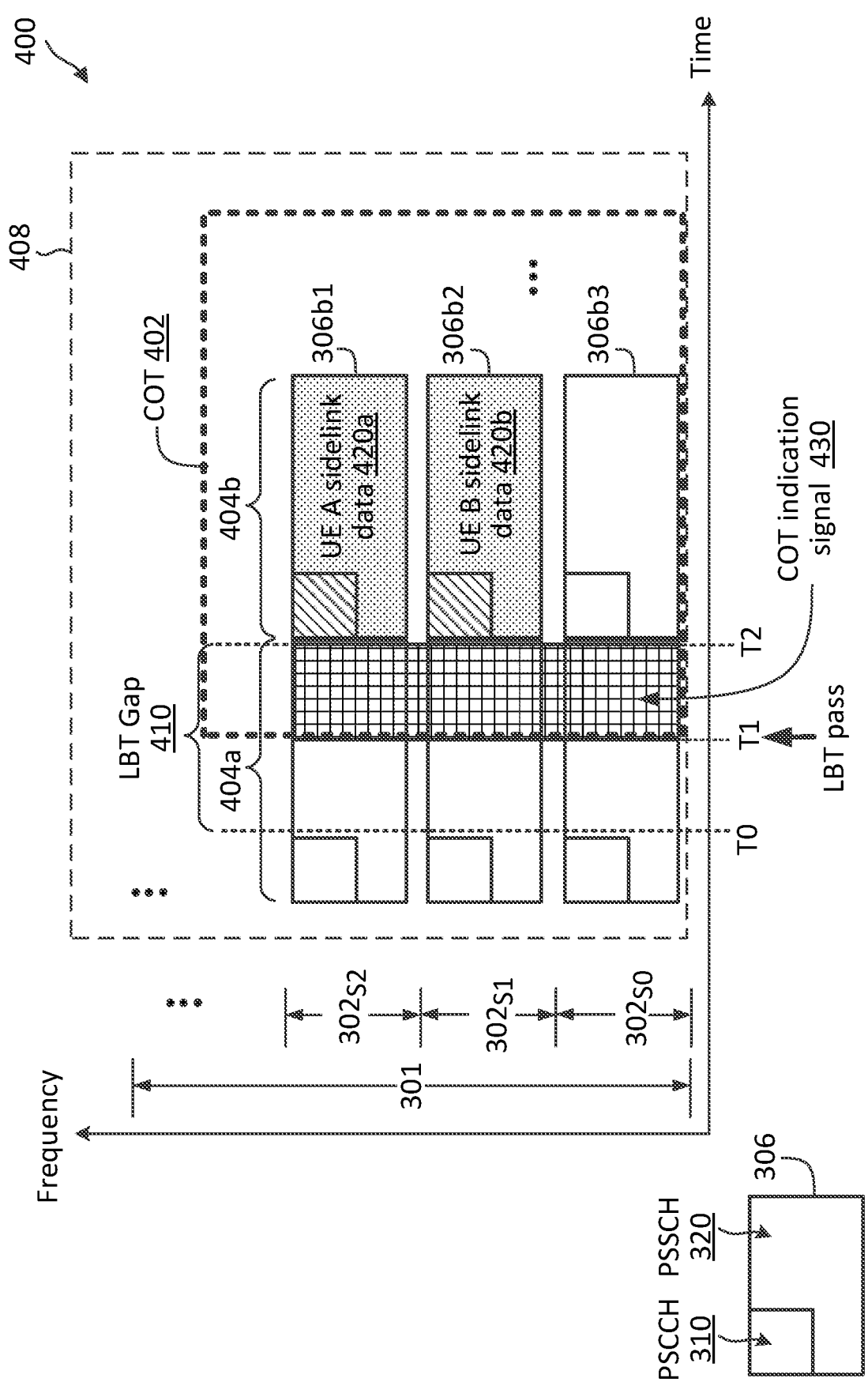
FIG. 4 illustrates a sidelink communication scheme with flexible LBT gaps according to some aspects of the present disclosure.

FIG. 4 illustrates a sidelink communication scheme 400 with flexible LBT gaps in a wireless communication network according to some aspects of the present disclosure. The scheme 400 may be employed by UEs such as the UEs 115 and/or 215 in a network such as the networks 100 and/or 200. In particular, sidelink UEs may employ the scheme 400 to communicate sidelink over a shared radio frequency band (e.g., in a shared spectrum or an unlicensed spectrum). The shared radio frequency band may be shared by multiple RATs as discussed in FIG. 2. In FIG. 4, the x-axis represents time in some arbitrary units, and the y-axis represents frequency in some arbitrary units. The scheme 400 is described using a similar frequency subband structure and a similar sidelink resource structure as in the scheme 300 and may use the same reference numerals as in FIG. 3 for simplicity's sake. Additionally, in FIG. 4, the pattern-filled boxes represent signal transmissions in corresponding sidelink resources 306 and the empty-filled boxes represent no transmission in corresponding sidelink resources 306.

Instead of inserting LBT gaps 305 at predetermined time and restricting LBT to be performed within the predetermined or fixed LBT gaps 305, the scheme 400 allows a sidelink UE (e.g., the UEs 115 and/or 215) to perform an LBT before a sidelink frame boundary within the duration of a previous sidelink frame 304. For instance, a BS (e.g., the BSs 105 and/or 205) may configure the sidelink UE with an LBT configuration for sidelink communication as shown in scheme 400. As shown, the shared radio frequency band 301 is time-partitioned into sidelink frames 404 (shown as 404a and 404b). The sidelink frames 404 may be substantially similar to the sidelink frames 304. For instance, the sidelink frames 404 may span across the plurality of frequency subbands 302 and may include a sidelink resource 306 in each frequency subband 302. However, the sidelink frames 404 are contiguous in time instead of spaced apart by LBT gaps as in the scheme 300. To facilitate LBT, an LBT gap 410 can be defined before the boundary of a sidelink frame 404. In other words, the LBT gap 410 may occupy at least a portion of a duration of a previous sidelink frame 404. A sidelink UE may perform an LBT (e.g., a CAT4 LBT) during the LBT gap 410 to contend for a COT in the shared frequency band 301.

In the illustrated example of FIG. 4, an LBT gap 410 is located before the sidelink frame 404b and within a duration of a previous sidelink frame 404a. The LBT gap 410 may start any time within the sidelink frame 404a. A sidelink UE A (e.g., the UEs 115 and/or 215) may perform an LBT (e.g., CAT4 LBT) during the LBT gap 410. For instance, channel access or LBT in the frequency band 301 may be in units of 20 MHz, and thus the sidelink UE A may perform a CAT4 LBT over a 20 MHz band (e.g., including about 4 subbands 302) during the LBT gap 410, for example, based on energy detection. In some other instances, the LBT may be in units of greater than 20 MHz or less than 20 MHz depending on channel access regulations and/or requirements in the frequency band 301.

In some aspects, after passing the LBT in the LBT gap 410 (e.g., at time T1), the sidelink UE A may start a COT 402 in the frequency band 301 beginning the time when the LBT passes. When the LBT is performed over a 20 MHz band including 4 frequency subbands 302, the COT 402 may span 20 MHz including the 4 frequency subbands 302. As discussed above, the LBT gap 410 may start any time within the sidelink frame 404a, and thus the sidelink UE A may start to perform the LBT at any time instant within the sidelink frame 404. The LBT may pass at any time and may have any suitable duration (e.g., based on a LBT parameters used for acquiring the COT 402). Thus, the COT 402 may be referred to as a floating COT since the COT 402 may start at any time and may end at any time. For simplicity of illustration and discussion, FIG. 4 illustrates one sidelink frame 404b within the COT 402. However, the COT 402 may be scaled to include a greater number of sidelink frames (e.g., about 2, 3, 4, 5, 6, 7 or more).

In some aspects, the sidelink UE A may pass the LBT, for example, at T1, before the start of the sidelink frame 404b. Since sidelink transmissions are aligned to the boundaries of the sidelink frames, the sidelink UE A may transmit a filler signal from time T1 (when the LBT passes) until the start of the sidelink frame 404b to occupy the channel so that other nodes or devices (e.g., of a different RAT or a different operator than the sidelink UE A) may not grab or access the channel during the remaining time in the sidelink frame 404a. In some aspects, the filler signal may be a predetermined sequence or waveform sequence.

In some aspects, the sidelink UE A may share the COT 402 with other sidelink UEs in the same sidelink system. The sidelink UE A may transmit a COT indication signal 430 before the start of the sidelink frame 404b. In some instances, the sidelink UE A may transmit a filler signal before the COT indication signal 430 depending on a starting time of the COT indication signal 430 as described in greater detail herein. The COT indication signal 430 may indicate timing information and/or frequency information associated with the COT 402 to allow other sidelink UEs to share the COT 402. For instance, the COT indication signal 430 may indicate a starting time and/or an ending time of the COT 402, the number of sidelink frames 404 within the COT 402, the sidelink resource(s) 306 and/or the subbands 302 within the COT 402 that are available for sharing by other sidelink UEs. The sidelink UE A may transmit the COT indication signal 430 using any suitable frequency resources within the subbands 302 during the COT 402, for example, at the beginning of the COT 402. The sidelink UE A may transmit the COT indication signal 430 in any suitable format. In some aspects, the COT indication signal 430 may include one or more COT sharing indicators indicating the COT sharing information. The COT sharing indicators can be in the form of a downlink control information (DCI) format. In some instances, the COT 402 for sharing may be referred to as a master COT (MCOT).

In some instances, the sidelink UE A may operate as a facilitator UE for contending COTs in the frequency band 301. A facilitator UE may contend for COTs and share the acquired COTs with other sidelink UE. The facilitator UE may or may not have sidelink data to be transmitted in its own COT. In other words, the facilitator UE may contend for a COT without intending to use the COT for sidelink transmissions. In some instances, the facilitator role may be assigned by a BS (e.g., the BSs 105 and/or 205). For instance, the BS may select a UEs that is capable of operating as a facilitator to contend for COTs, for example, based on the processing and/or power capabilities of the UE. For example, some sidelink UEs may be low-power devices and may have a limited processing capability, and thus may not be suitable to operate as a facilitator. In some instances, the BS can assign a UE that is not participating in any sidelink communication with a peer to act as a facilitator. In some instances, the BS may assign multiple UEs to be facilitators, where each facilitator may facilitate COT contention and COT sharing among a group of sidelink UEs.

In some instances, a facilitator UE may also contend for a COT when the facilitator UE has sidelink data to be transmitted to a peer sidelink UE. In the illustrated example of FIG. 4, after acquiring the COT 402, the sidelink UE A may transmit SCI and sidelink data 420a (e.g., user data) via the PSCCH 310 and the PSSCH 320 in the sidelink resource 306b1, respectively, during the COT 402. In some instances, the sidelink UE A may have previously transmitted SCI indicating a reservation for the sidelink resource 306b1. In some other instances, the sidelink UE A may transmit in the sidelink resource 306b1 without a reservation.

Another sidelink UE (e.g., a sidelink UE B) in the same sidelink system may monitor for a COT indication signal 430 in the frequency band 301. Upon detecting the COT indication signal 430, the sidelink UE B may share the COT 402 of the sidelink UE A and transmit in the sidelink resource 306b2 located at the frequency subband $302_{S1}$ during the sidelink frame 404b. For instance, the sidelink UE B may identify the sidelink resource 306b2 based on the COT indication signal 430 and transmit SCI and sidelink data 420b (e.g., user data) in the sidelink resource 306b2. In some aspects, the sidelink UE B may perform a CAT1 LBT or a CAT2 LBT prior to transmitting in the sidelink UE A's COT 402. In some instances, not all sidelink resources 306 within the COT 402 may be utilized by another sidelink UE. For instance, the sidelink resource 306b3 may not be utilized by any sidelink UE as shown by the empty-filled PSCCH 310 and PSSCH 320. In some other instances, all sidelink resources within the COT 402 can be utilized by other sidelink UE(s) based on the sharing of the COT 402. In some instances, the sidelink UE B may be a regular sidelink UE without being configured as a facilitator role. A non-facilitator UE may be referred to as a passive UE. In other words, the sidelink UE B may monitor for a COT sharing opportunity when the sidelink UE B has sidelink data to be transmitted instead of performing an LBE-like LBT as discussed above to acquire a COT for its own transmission. In some other instances, the sidelink UE B may also be configured with a facilitator role. In other words, a facilitator sidelink UE may contend for COTs using LBE-like LBTs with flexible LBT gaps (e.g., the LBT gap 410) and may also monitor for COT sharing opportunities as described in greater detail herein.

In some instances, the COT indication signal 430 may indicate whether a sidelink UE sharing the COT 402 may transmit in the COT 402 with or without performing an LBT. The COT indication signal 430 may indicate an LBT mode for each sidelink frame 404 and/or each frequency subband within the COT 402. The LBT mode may indicate a CAT1 LBT (e.g., a no LBT mode) or a CAT2 LBT. As such, a sidelink UE sharing the COT 402 may perform an LBT according to the LBT mode indicated by the COT indication signal 430 before transmitting a sidelink transmission in the COT 402. The LBT may be performed at the start of a corresponding sidelink frame boundary. For instance, the COT indication signal 430 may indicate a CAT1 LBT or no LBT mode for transmissions in the sidelink frame 404*b* and may indicate a CAT2 LBT mode for transmissions in subsequent sidelink frames 404 within the COT 402. Thus, if the sidelink UE B has sidelink data to be transmitted in a sidelink frame subsequent to the sidelink frame 404*b* in the COT 402, the sidelink UE B may perform a CAT2 LBT beginning at the end of the sidelink frame 404*b*. The sidelink UE B may perform the CAT2 LBT based on a LBT subband size in the shared frequency band 301. For instance, when the frequency band 301 is a 5 GHz band, the LBT subband size is restricted to about 20 MHz, for example, based on regulations. Thus, the sidelink UE B may perform the CAT2 LBT over 20 MHz similar to the LBT band size used by the CAT4 LBT performed by the sidelink UE A for acquiring the COT 402.

In some aspects, the facilitator sidelink UE A may determine whether a CAT4 LBT is allowed to be performed within the sidelink frame 404*a* (e.g., during the LBT gap 410) based on whether SCI is decoded during the sidelink frame 404*a*. For instance, if the sidelink UE A determines that there is no SCI decoded in any of the sidelink resources 306 within the sidelink frame 404*a* (shown by the empty-filled PSCCH 310 boxes), the sidelink UE A is allowed to perform an LBT in the LBT gap 410. Conversely, if the sidelink UE A can correctly decode at least one SCI in a sidelink resource 306 within the sidelink frame 404*a*, the sidelink UE A is not allowed to perform an LBT in the sidelink frame 404*a*. In some instances, the sidelink UE A may determine whether SCI is decoded from the sidelink frame 404*a* by monitoring the PSCCH 310 in each frequency subband 302 during the sidelink frame 404*a*. For instance, the sidelink UE A may receive a signal from the channel during the beginning of the sidelink frame 404*a* and attempt to perform blind SCI decoding on the received signal (e.g., on a per subband 302 basis).

The use of SCI detection to restrict a sidelink UE from performing an LBT and subsequently transmitting a COT indication signal 430 during a sidelink frame 404 can suppress hidden nodes. For instance, the sidelink UE A may perform the LBT based on an energy detection threshold of about −62 decibel-milliwatts (dBm). If an ongoing sidelink transmission in a sidelink resource 306 within the sidelink frame 404*a* is at about −72 dBm with respect to the sidelink UE A, the sidelink UE A may fail to detect the presence of the transmission using the −62 dBm energy detection threshold. Thus, the sidelink UE A may proceed with passing the LBT and subsequently transmitting the COT indication signal 430. The transmission of the COT indication signal 430 can impact and interfere with the ongoing sidelink transmission in the sidelink frame 404*a*. The use of SCI detection may allow the sidelink UE A to have a greater detection sensitivity (e.g., up to about −82 dBm), and thus may reduce the presences of hidden nodes.

Similar to the scheme 300, the sidelink UE A and/or the sidelink UE B may be preconfigured with a resource pool 408 in the frequency band 301, for example, while in a coverage of a serving BS. The resource pool 408 may include a plurality of sidelink resources 306. The resource pool 408 may include any suitable number of frequency subbands 302 within the frequency band 301 and any suitable number of sidelink frames 404. The BS may configure the sidelink UE with a resource pool configuration (e.g., via an RRC configuration) indicating the sidelink resources 306, the number of frequency subbands band 302, and/or the number of sidelink frames 404 within the resource pool 408. Additionally, the BS may configure the sidelink UE A and/or the sidelink UE B information related to channel access in the resource pool 408. For instance, the channel access information may indicate an LBT unit size (e.g., in units of 20 MHz). Mechanisms for acquiring a sidelink COT for autonomous sidelink communication and sharing a sidelink COT are described in greater detail herein.

Figure 5:
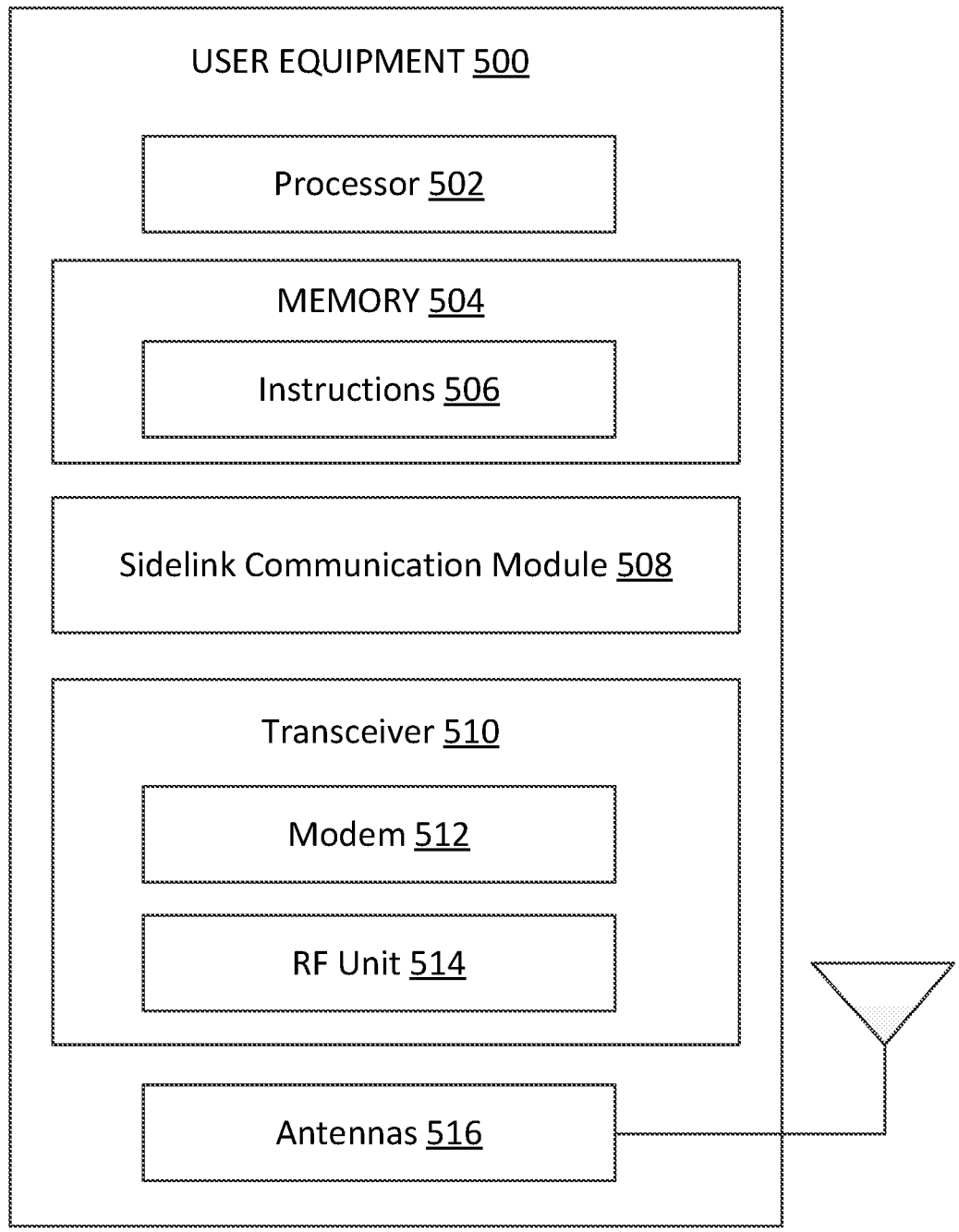
FIG. 5 is a block diagram of a user equipment (UE) according to some aspects of the present disclosure.

FIG. 5 is a block diagram of an exemplary UE 500 according to some aspects of the present disclosure. The UE 500 may be a UE 115 discussed above in FIG. 1 or a UE 215 discussed above in FIG. 2. As shown, the UE 500 may include a processor 502, a memory 504, a sidelink communication module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 1-4 and 7-14. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sidelink communication module 508 may be implemented via hardware, software, or combinations thereof. For example, the sidelink communication module 508 may be implemented as a processor, circuit, and/or instructions 506 stored in the memory 504 and executed by the processor 502. In some instances, the sidelink communication module 508 can be integrated within the modem subsystem 512. For example, the sidelink communication module 508 can be implemented by a combination of software components (e.g., executed by a DSP or a general processor) and hardware components (e.g., logic gates and circuitry) within the modem subsystem 512.

The sidelink communication module 508 may be used for various aspects of the present disclosure, for example, aspects of FIGS. 1-4 and 7-14. For instance, the sidelink communication module 508 is configured to perform an LBT (e.g., a CAT4 LBT) in a shared radio frequency band (e.g., the frequency band 301) during at least a portion of a first sidelink frame (e.g., the sidelink frame 404), determine a COT (e.g., the COT 402) based on passing the LBT, and transmit a COT indication signal (e.g., the COT indication signal 430) at the beginning of COT within the first sidelink frame. The beginning of the COT may be within the first sidelink frame and offset from a boundary of the first sidelink frame. The COT may include one or more sidelink frames subsequent to the first sidelink frame. The COT indication signal may include COT sharing information for other sidelink UEs (e.g., the UEs 115 and/or 215) in the sidelink system to share the one or more sidelink frames in the COT. Some examples of COT sharing information may include the number of sidelink frames, the number of frequency subbands, a COT starting time, a COT ending time, and/or an LBT mode for the sidelink UEs to transmit in the COT.

In some aspects, the sidelink communication module 508 is configured to determine a time instance for transmitting the COT indication signal based on a CBR value, a duration of the COT, and/or a number of LBT failures associated with LBTs performed at predetermine starting points.

In some aspects, the sidelink communication module 508 is configured to perform SCI sensing in the first sidelink frame and determine whether an LBT can be performed to occupy the shared frequency band in the first sidelink frame based on the SCI sensing. For instance, the sidelink communication module 508 is configured to proceed with performing an LBT within at least a duration of the first sidelink frame if there is no SCI detected in the first sidelink frame. The sidelink communication module 508 is configured to refrain from perform and LBT during the first sidelink frame if the sidelink UE correctly decoded SCI in the first sidelink frame. In some instances, the sidelink communication module 508 is configured to proceed with performing an LBT within at least a duration of the first sidelink frame if the sidelink UE correctly decoded SCI in the first sidelink frame and the sidelink UE is intending to reserve the channel for sidelink data with a higher priority than the decoded SCI. The sidelink communication module 508 is configured to refrain from perform and LBT during the first sidelink frame if the sidelink UE correctly decoded SCI in the first sidelink frame and the sidelink UE is intending to reserve the channel for sidelink data with a lower priority than the decoded SCI. In some instances, the sidelink communication module 508 is configured to proceed with performing an LBT within at least a duration of the first sidelink frame if the sidelink UE correctly decoded SCI in the first sidelink frame and the number of LBT failures (e.g., for LBTs with predetermined LBT starting points) at the sidelink UE exceeds a threshold. The sidelink communication module 508 is configured to refrain from perform and LBT during the first sidelink frame if the sidelink UE correctly decoded SCI in the first sidelink frame and the number of LBT failures at the sidelink UE is below the threshold.

In some aspects, the sidelink communication module 508 is configured to monitor for a COT indication signal in the shared radio frequency band, receive a COT indication signal indicating sharing information for a COT based on the monitoring, and transmit sidelink communication (e.g., including SCI and/or sidelink data) to a peer in the COT based on the COT sharing information.

In some aspects, the sidelink communication module 508 is configured to perform a CAT4 LBT to acquire for a COT in the share radio frequency band concurrent with the COT indication signal monitoring, transmit in the shared radio frequency band during its own COT and terminate the COT indication signal monitoring, transmit in the COT indicated by the COT indication signal and terminates the CAT4 LBT if the CAT4 LBT passes, the sidelink UE may, or refrain from accessing shared radio frequency band.

In some aspects, the sidelink communication module 508 is configured to shorten the duration of a sidelink transmission in a last sidelink frame of the COT to provide an LBT gap for a sidelink UE to perform an LBT for transmission in a sidelink frame adjacent and subsequent to the last sidelink frame. In some aspects, the sidelink communication module 508 is configured to determine CBR measurements, receive regional CBR values, determine the LBT gap to leave at the end of the last sidelink frame based on a priority of the sidelink transmission in the last sidelink frame and/or a CBR (e.g., the CBR measurements or the regional CBR values).

In some aspects, the sidelink communication module 508 is configured to receive a synchronization signal from a BS (e.g., the BSs 105 and/or 205) or another sidelink UE, perform time and/or frequency synchronization based on the received signal, determine radio frame boundaries and/or sidelink frame boundaries based on the synchronization, and/or receive sidelink resource pool configurations.

In some aspects, the UE 500 may be configured as a facilitator in a sidelink system for COT contention and COT sharing and the sidelink communication module 508 is configured to receive a configuration assigning the UE 500 as a facilitator UE, contend for COTs in the shared radio frequency band and share the COT with other sidelink UEs as discussed above. In some aspects, the UE 500 may be configured as a passive UE in a sidelink system and the sidelink communication module 508 is configured to monitor for COT sharing opportunities and transmit sidelink in a COT through COT sharing as discussed above. In some aspects, the UE 500 may be configured as a facilitator in a sidelink system and also share a COT of another UE 500. Mechanisms for sidelink communication over a shared radio frequency band or an unlicensed band are described in greater detail herein.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the sidelink communication module 508 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., SCI, sidelink data, COT indication signal, synchronization signal, SSBs) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., RRC configurations, facilitator configuration, SCI, sidelink data, COT indication signal, synchronization signal, SSBs) to the sidelink communication module 508 for processing. The antennas 516 may include multiple antennas of similar or different designs in order to sustain multiple transmission links. The RF unit 514 may configure the antennas 516.

In some aspects, the transceiver 510 is configured to perform an in a shared radio frequency band during at least a portion of a first sidelink frame and determine a COT in the shared radio frequency band based on the LBT, for example, by coordinating with the sidelink communication module 508. A beginning of the COT is within the first sidelink frame and offset from a boundary of the first sidelink frame. The COT includes one or more sidelink frames subsequent to the first sidelink frame. The transceiver 510 is further configured to and transmit, in the shared radio frequency band, a COT indication signal at the beginning of the COT within the first sidelink frame, for example, by coordinating with the sidelink communication module 508, where the COT indication signal includes COT sharing information for UEs to share the one or more sidelink frames.

In some aspects, the transceiver 510 is configured to receive, a COT indication signal in a shared radio frequency band, for example, by coordinating with the sidelink communication module 508. A beginning of the COT indication signal is within a first sidelink frame and offset from a boundary of the first sidelink frame and the COT indication signal indicates one or more sidelink frames subsequent to the first sidelink frame for sharing. The transceiver 510 is further configured to transmit, to a second UE, a first sidelink communication including SCI and sidelink data during a second sidelink frame of the one or more sidelink frames based on the COT indication signal.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
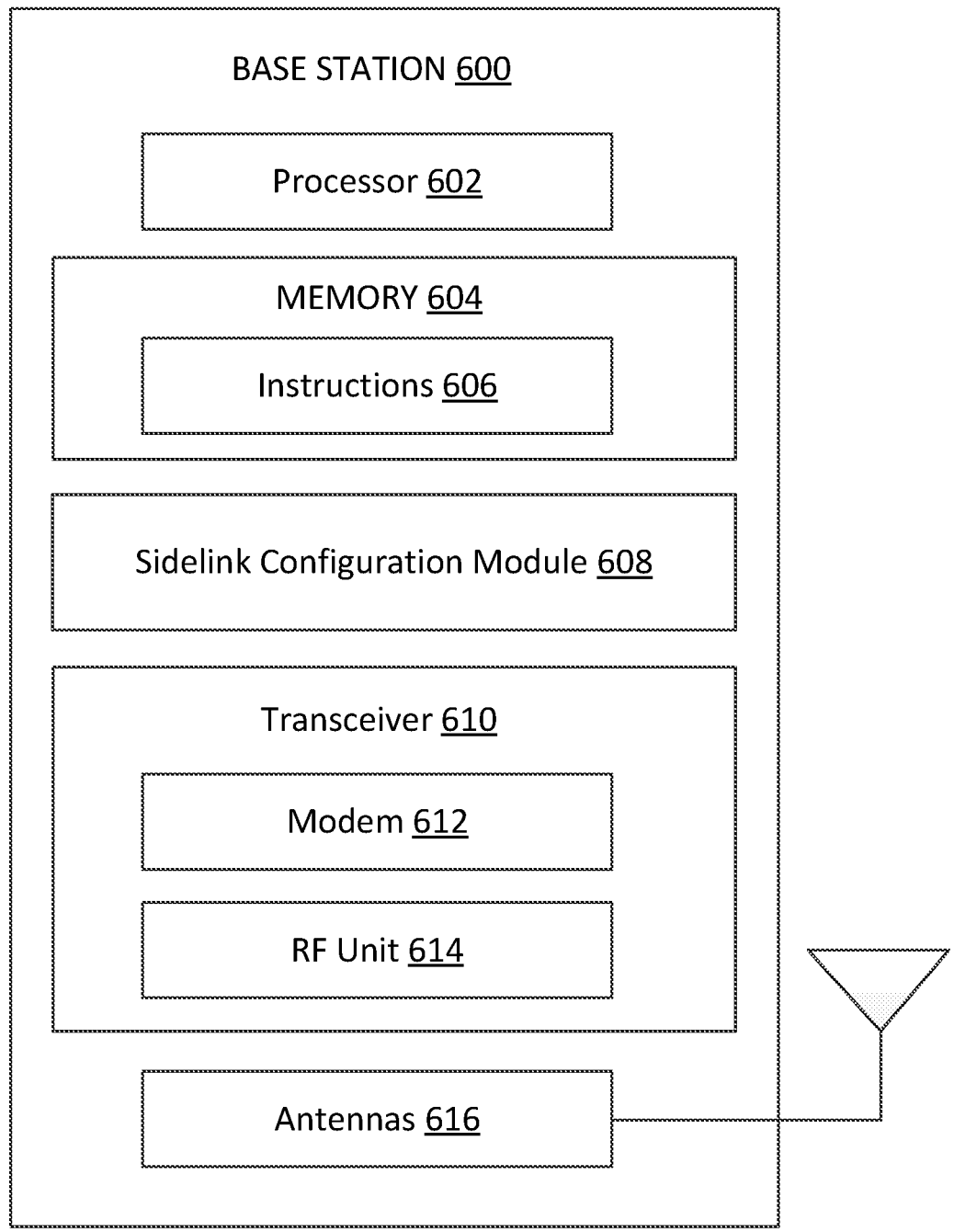
FIG. 6 is a block diagram of an exemplary base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1 or a BS 205 in the network 200 as discussed above in FIG. 2. As shown, the BS 600 may include a processor 602, a memory 604, a sidelink configuration module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 1-4 and 7-12. Instructions 606 may also be referred to as code, which may be interpreted broadly to include any type of computer-readable statement(s) as discussed above with respect to FIG. 5.

The sidelink configuration module 608 may be implemented via hardware, software, or combinations thereof. For example, the sidelink configuration module 608 may be implemented as a processor, circuit, and/or instructions 606 stored in the memory 604 and executed by the processor 602. In some instances, the sidelink configuration module 608 can be integrated within the modem subsystem 612. For example, the sidelink configuration module 608 can be implemented by a combination of software components (e.g., executed by a DSP or a general processor) and hardware components (e.g., logic gates and circuitry) within the modem subsystem 612.

The sidelink configuration module 608 may be used for various aspects of the present disclosure, for example, aspects of FIGS. 1-4 and 7-12. For instance, the sidelink configuration module 608 is configured to transmit, to a UE (e.g., the UEs 115, 215, and/or 500), a sidelink configuration indicating a sidelink resource pool, transmit SSBs to facilitate synchronization at UEs, select facilitator UE, and/or transmit configurations to configure facilitator UEs. The sidelink configuration may indicate time-frequency resources for a sidelink resource pool (e.g., the frequency band 301, the frequency subbands 302, the sidelink frames 404). In some aspects, the sidelink configuration module 608 is configured to transmit CBR and/or CR report configurations to UEs, receive LBT-aware CR reports, receive CBR measurement reports from UEs, determine regional CBR values based on the CBR measurement reports, transmit indications of regional CBR values, and/or control intra-sidelink collision. For instance, the sidelink configuration module 608 is configured to adjust the resource pool configurations and/or re-select facilitator UEs to control the intra-sidelink collision. Mechanisms for configuring sidelink UEs for channel access in a shared radio frequency band and/or an unlicensed band are described in greater detail herein.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS, e.g., a LDPC coding scheme, a turbo coding scheme, a convolutional coding scheme, a polar coding scheme, a digital beamforming scheme, etc. The RF unit 614 may be configured to process (e.g., perform analog to digital conversion or digital to analog conversion, etc.) modulated/encoded data (e.g., PDCCH, PDSCH, SSBs, sidelink configuration, sidelink resource pool configuration, SSBs, frequency hopping patterns for sidelink communication) from the modem subsystem 612 (on outbound transmissions) or of transmissions originating from another source such as a UE 115 and/or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., frequency hopping aware-CBR reports, LBT-aware CR reports, and/or frequency hopping and LBT-aware CR reports) to the sidelink configuration module 608 for processing. The antennas 616 may include multiple antennas of similar or different designs in order to sustain multiple transmission links.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7:
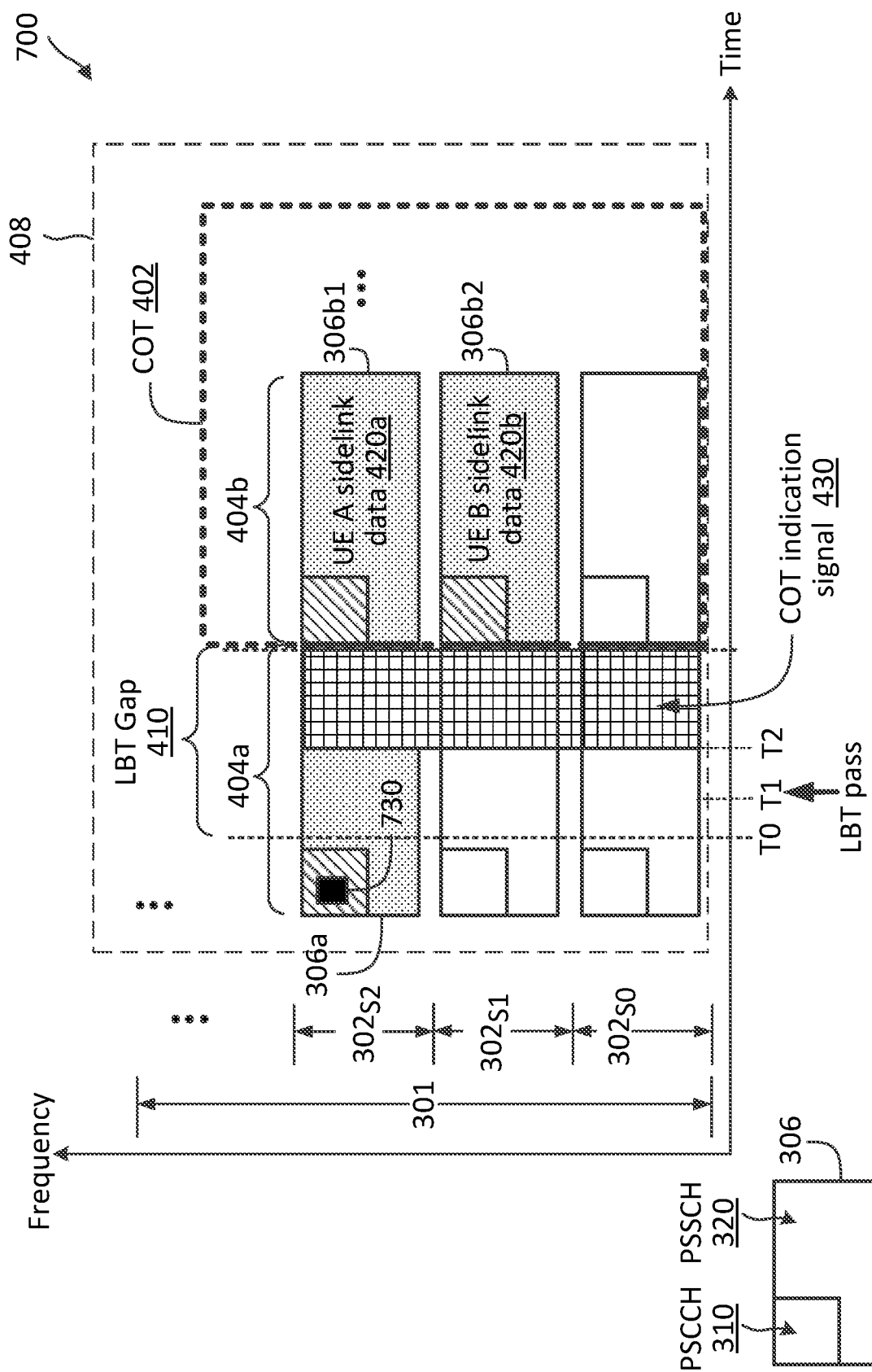
FIG. 7 illustrates a sidelink communication scheme with flexible LBT gaps according to some aspects of the present disclosure.

FIG. 7 illustrates a sidelink communication scheme 700 with flexible LBT gaps according to some aspects of the present disclosure. The scheme 700 may be employed by UEs such as the UEs 115, 215, and/or 500 in a network such as the networks 100 and/or 200. In particular, sidelink UEs may employ the scheme 700 to communicate sidelink over a shared radio frequency band (e.g., in a shared spectrum or an unlicensed spectrum). The shared radio frequency band may be shared by multiple RATs as discussed in FIG. 2. In FIG. 7, the x-axis represents time in some arbitrary units, and the y-axis represents frequency in some arbitrary units. The scheme 700 is described using a similar sidelink resource structure as in the scheme 300 and a similar sidelink frame and LBT gap configuration as in the scheme 400 and may use the same reference numerals as in FIGS. 3 and 4 for simplicity's sake. Additionally, the pattern-filled boxes represent signal transmissions in corresponding sidelink resources 306 and the empty-filled boxes represent no transmission in corresponding sidelink resources 306.

The scheme 700 is substantially similar to the scheme 400, but may allow a sidelink UE (e.g., the UEs 115, 215, and/or 500) to perform an LBT (e.g., a CAT4 LBT) within a duration of a sidelink frame with a detected SCI if the sidelink UE is intending to reserve a sidelink resource for sidelink data of a high priority than the detected SCI. In other words, the scheme 700 allows an LBT associated with high-priority sidelink data to override SCI associated with lower-priority sidelink data. For instance, a BS (e.g., the BSs 105 and/or 205) may configure the sidelink UE with an LBT configuration for sidelink communication as shown in scheme 700

For instance, the sidelink UE A may monitor for SCI from another sidelink UE during the sidelink frame 404a. In the illustrated example of FIG. 7, the sidelink UE A may detect SCI 730 (transmitted by another sidelink UE) in the sidelink resource 306a. The SCI 730 may indicate a priority of sidelink data in the sidelink resource 306a. If sidelink UE A determines that the sidelink data priority indicated by the SCI 730 has a lower priority than sidelink data to be transmitted by the sidelink UE A (e.g., in the sidelink frame 404b upon a successful LBT), the sidelink UE A may proceed with performing an LBT in the frequency band 301 during the LBT gap 410 within the sidelink frame 404a. Upon passing the LBT (e.g., at time T1), the sidelink UE A may start a COT 402 at time T1 and transmit a COT indication signal 430 before the start of the sidelink frame 404b to share the COT 402 with other sidelink UEs (e.g., a sidelink UE B) and/or transmit sidelink data 420a in the sidelink resource 306b1 as discussed above in the scheme 400 with reference to FIG. 4. If the sidelink UE A determines that the sidelink data priority indicated by the SCI 730 has a higher priority than sidelink data to be transmitted by the sidelink UE A (e.g., in the sidelink frame 404b upon a successful LBT), the sidelink UE A may refrain from performing an LBT during the sidelink frame 404a (e.g., in the LBT gap 410).

Figure 8:
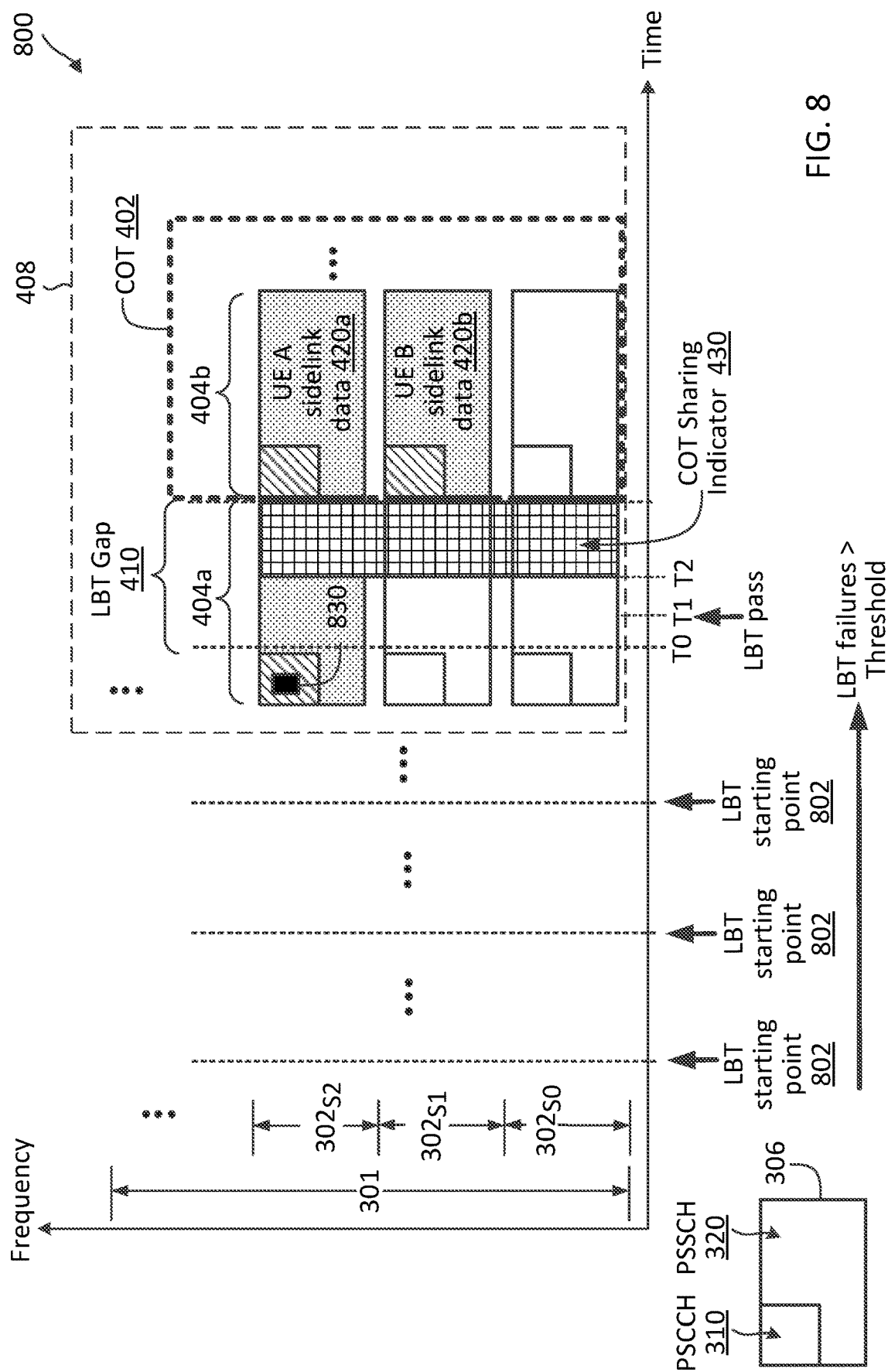
FIG. 8 illustrates a sidelink communication scheme with flexible LBT gaps according to some aspects of the present disclosure.

FIG. 8 illustrates a sidelink communication scheme 800 with flexible LBT gaps according to some aspects of the present disclosure. The scheme 800 may be employed by UEs such as the UEs 115, 215, and/or 500 in a network such as the networks 100 and/or 200. In particular, sidelink UEs may employ the scheme 800 to communicate sidelink over a shared radio frequency band (e.g., in a shared spectrum or an unlicensed spectrum). The shared radio frequency band may be shared by multiple RATs as discussed in FIG. 2. In FIG. 8, the x-axis represents time in some arbitrary units, and the y-axis represents frequency in some arbitrary units. The scheme 800 is described using a similar sidelink resource structure as in the scheme 300 and a similar sidelink frame and LBT gap configuration as in the scheme 400 and may use the same reference numerals as in FIGS. 3 and 4 for simplicity's sake. Additionally, the pattern-filled boxes represent signal transmissions in corresponding sidelink resources 306 and the empty-filled boxes represent no transmission in corresponding sidelink resources 306.

The scheme 800 is substantially similar to the scheme 400, but may allow a sidelink UE (e.g., the UEs 115, 215, and/or 500) to perform an LBT (e.g., a CAT4 LBT) within a duration of a sidelink frame with a detected SCI if the sidelink UE has failed fixed starting point LBT for a certain number of times. For instance, the sidelink UE A attempts to perform LBT starting at predetermined LBT starting points 802, which may semi-static, for a number of times and failed. In some instances, the LBT starting points 802 may be located at starting boundaries of sidelink frames 404. If the sidelink UE A detected SCI 830 in the sidelink frame 404a and the number of LBT failures from the LBTs starting at the LBT starting points 802 is greater than a certain threshold (e.g., a preconfigured or semi-static threshold), the sidelink UE A may proceed to perform an LBT in the frequency band 301 within the sidelink frame 404a (e.g., during the LBT gap 410). In some instances, the threshold for the number of LBT failures may be about 3, 4, 5, 6, 7 or more. Upon passing the LBT (e.g., at time T1), the sidelink UE A may start a COT 402 at time T1 and transmit a COT indication signal 430 before the start of the sidelink frame 404b to share the COT 402 with other sidelink UEs (e.g., a sidelink UE B) and/or transmit sidelink data 420a in the sidelink resource 306b1 as discussed above in the scheme 400 with reference to FIG. 4. If the sidelink UE A detected SCI 830 in the sidelink frame 404a and the number of LBT failures from the LBTs starting at the LBT starting points 802 is less than the threshold, the sidelink UE A may refrain from performing an LBT during the sidelink frame 404a (e.g., in the LBT gap 410). fs In some aspects, a sidelink UE that is not configured as a facilitator UE may not perform an LBT at any time. The non-facilitator sidelink UE may be configured to perform LBT starting at predetermined LBT starting points (e.g., the LBT starting points 802). The scheme 800 allows a non-facilitator sidelink UE to perform a flexible LBT (e.g., LBE-like LBT) similar to a facilitator sidelink UE if the non-facilitator sidelink UE fails the predetermined or fixed starting point LBT multiple times (e.g., exceeding a threshold), the non-facilitator sidelink UE may.

Figure 9:
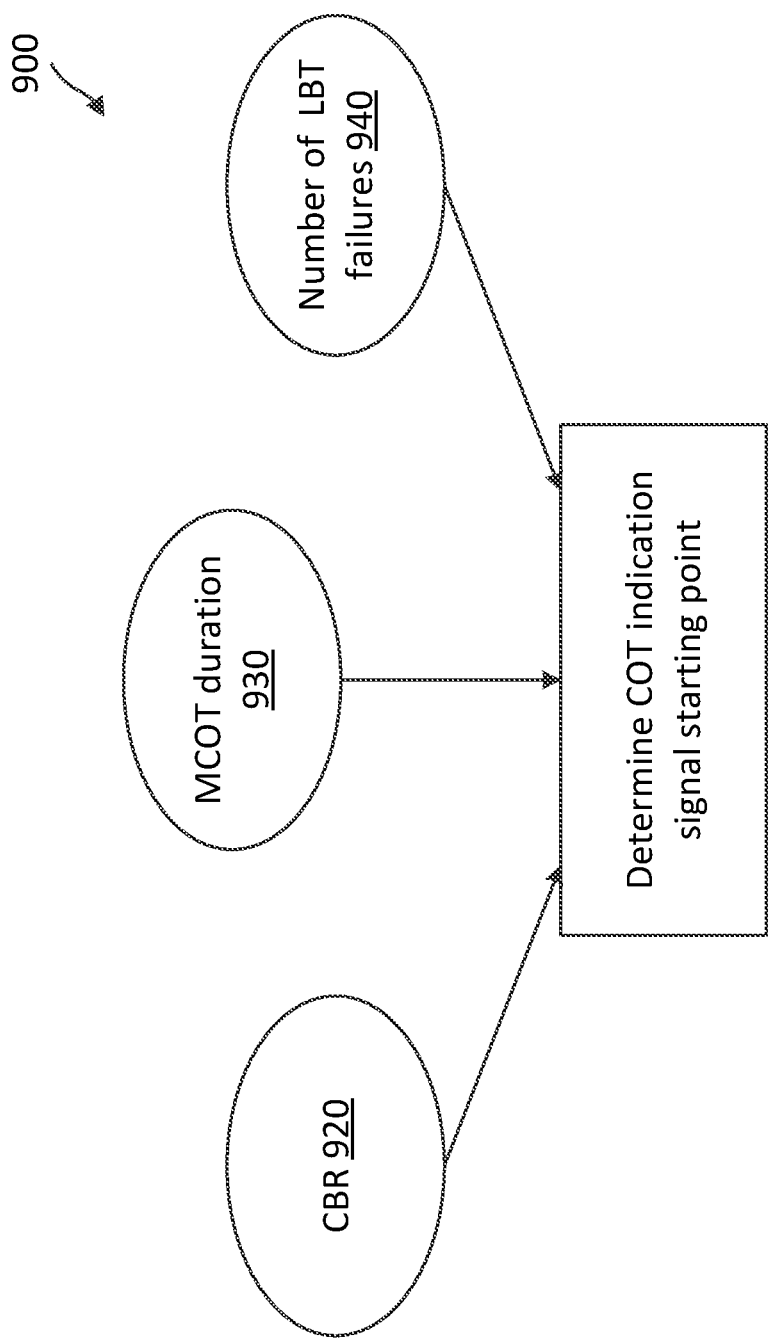
FIG. 9 illustrates a sidelink channel occupancy time (COT) indication signal transmission scheme according to some aspects of the present disclosure.

FIG. 9 illustrates a sidelink COT indication signal transmission scheme 900 according to some aspects of the present disclosure. The scheme 900 may be employed by UEs such as the UEs 115, 215, and/or 500 in a network such as the networks 100 and/or 200. In particular, sidelink UEs may employ the scheme 900 to determine an earliest starting time for transmitting a sidelink COT indication signal (e.g., the indication signal 430) after passing an LBT. The scheme 900 may be employed in conjunction with the schemes 400, 700, and/or 800 discussed above with reference to FIGS. 4, 7, and/or 8.

In the scheme 900, a sidelink UE (e.g., the UEs 115, 215, and/or 500) may determine an earliest time for transmitting a COT indication signal (e.g., the COT indication signal 430) after passing a CAT4 LBT in a channel (e.g., the frequency band 301). The earliest time when a COT indication signal can occupy the channel may be dependent on a CBR 920, a MCOT duration 930, and/or a number of LBT failures 940.

A CBR is a metric indicating a number of subchannels (e.g., the frequency subbands 302) in a sidelink resource pool (e.g., the resource pool 408) with a measured receive signal strength indicator (RSSI) greater than a preconfigured threshold divided by the total number of subchannels in the resource pool. The CBR metric can be computed for a certain number of time intervals or subframes (e.g., the sidelink frames 404). The CBR can provide an estimation on the total state of the channel. In some instances, a sidelink UE may compute the CBR 920 by measuring RSSI in the subchannels within the resource pool over a time interval including a number of subframes (e.g., about 100), counting the number of subchannels with an RSSI above the preconfigured threshold in the time interval (e.g., a subchannel count), and dividing the subchannel count by the total number of subchannels in the resource pool.

In some aspects, if the CBR 920 is high, the sidelink UE may start to transmit a COT indication signal at an earlier time, for example, immediately after passing a CAT4 LBT. If the CBR 920 is low, the sidelink UE may start to transmit a COT indication signal at a later time, for example, 1 symbol time after passing a CAT4 LBT. In other words, when the CBR is high indicating that the channel is busy, the sidelink UE may be more aggressive in competing for the channel with devices of other technologies, such as WiFi. If the sidelink UE determines not to transmit a COT indication signal immediately after passing the LBT, the sidelink UE may transmit a filler signal to occupy the channel before transmitting the COT indication signal. In some instances, the sidelink UE may utilize one or more components, such as the processor 502, the sidelink communication module 508, the transceiver 510, the modem 512, and the one or more antennas 516, to count the number of subchannels with an RSSI above the preconfigured threshold over a time interval, compute the CBR 920 based on the count and a total number of frequency subchannels in the sidelink resource pool, and determine an earliest starting time for transmitting a COT indication signal based on the computed CBR 920.

In some instances, the sidelink UE may receive the CBR 920 from a BS (e.g., the BSs 105, 205, and/or 600. In this regard, the BS may receive CBR measurement reports from one or more sidelink UEs located within a certain area or region. The BS may determine a CBR 920 based on the received CBR measurement reports. The BS may broadcast the determined CBR 920 and request sidelink UEs within the area or region to replace the individual CBR measurement determined by the sidelink UE with the regional CBR 920 for determining an earliest starting time for transmitting a COT indication signal.

In some aspects, the longer the MCOT (e.g., the COT 402), the earlier the COT indication signal may be transmitted to occupy the channel (e.g., the frequency band 301) upon passing a CAT4 LBT in the channel. The MCOT duration 930 may be dependent on the LBT parameters used by the sidelink UE to perform the LBT. Some examples of CAT4 LBT parameter may include a number of CCA deferral slots, a contention window size, and/or an energy detection threshold. For instance, the greater the number of CCA deferral slots, the larger the contention window size, and/or the lower the energy detection threshold, the longer the MCOT may be utilized or reserved by the sidelink UE. In some instances, the sidelink UE may utilize one or more components, such as the processor 502, the sidelink communication module 508, the transceiver 510, the modem 512, and the one or more antennas 516, to determine a MCOT duration based on the CAT4 LBT parameters used for acquiring the MCOT, and determine an earliest starting time for transmitting a COT indication signal based on the MCOT duration 930.

In some aspects, the greater number of starting LBT failures 940, the earlier the COT indication signal may be transmitted to occupy the channel (e.g., the frequency band 301) upon passing a CAT4 LBT in the channel. The LBT failures 940 may be failures from LBT performed utilizing predetermined or fixed LBT starting points (e.g., the LBT starting points 802). In some instances, the sidelink UE may utilize one or more components, such as the processor 502, the sidelink communication module 508, the transceiver 510, the modem 512, and the one or more antennas 516, to count a number of LBT failures with LBT using predetermined LBT starting points and determine an earliest starting time for transmitting a COT indication signal based on the number of LBT failures 940.

In some aspects, the sidelink UE may determine an earliest starting time for transmitting a COT indication signal based on the CBR 920 and the MCOT duration 930. In some aspects, the sidelink UE may determine an earliest starting time for transmitting a COT indication signal based on the CBR 920 and the number of LBT failures 940. In some aspects, the sidelink UE may determine an earliest starting time for transmitting a COT indication signal based on the MCOT duration 930 and the number of LBT failures 940. In some aspects, the sidelink UE may determine an earliest starting time for transmitting a COT indication signal based on the CBR 920, the MCOT duration 930, and the number of LBT failures 940.

Figure 10:
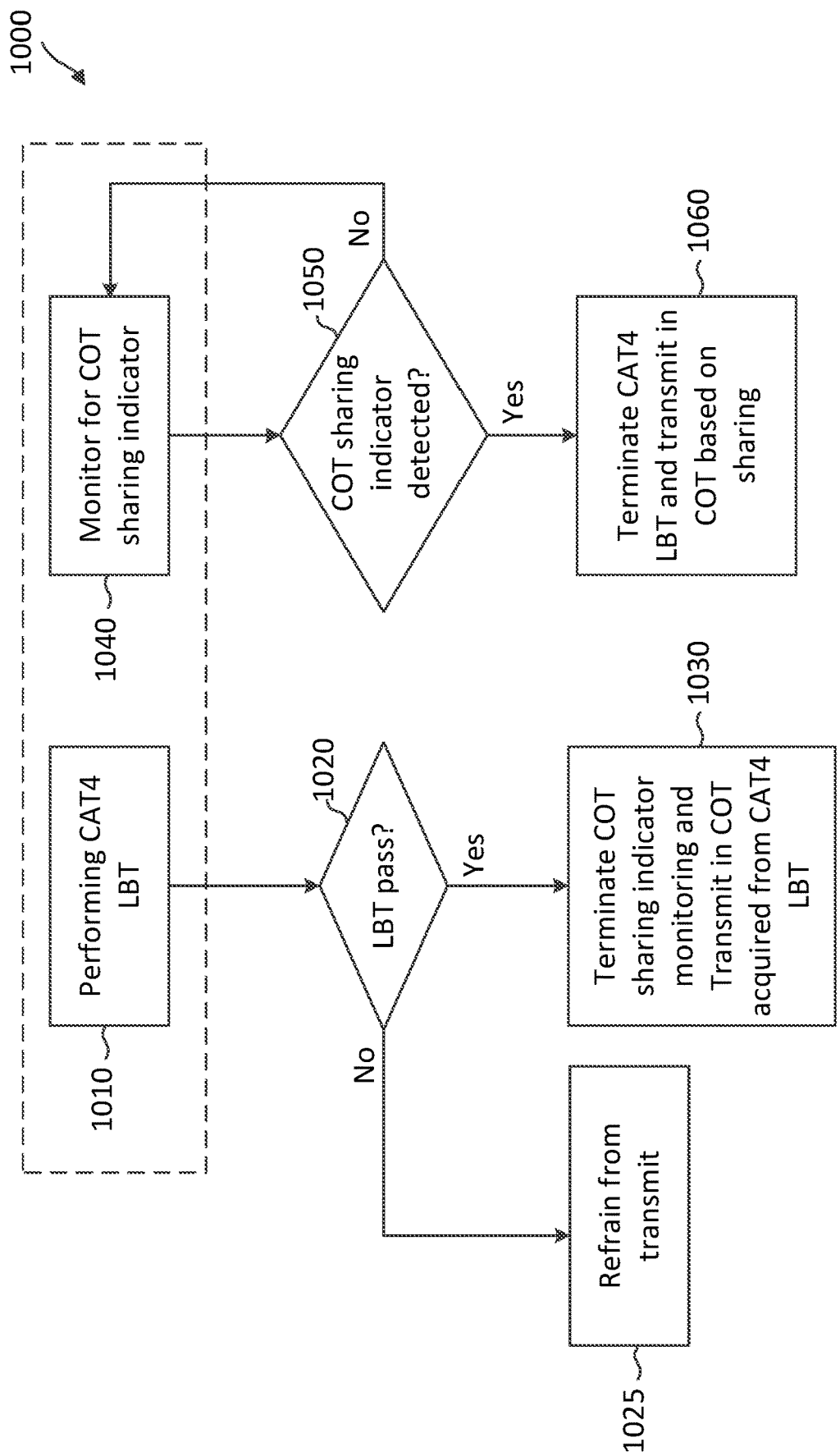
FIG. 10 is a flow diagram of a sidelink communication method with concurrent LBT and COT indication monitoring according to some aspects of the present disclosure.

FIG. 10 is a flow diagram of a sidelink communication method 1000 with concurrent LBT and COT indication monitoring according to some aspects of the present disclosure. Aspects of the method 1000 can be executed by a computing device (e.g., a processor, processing circuit, and/or other suitable component) of a wireless communication device or other suitable means for performing the steps. For example, a sidelink UE, such as the UEs 115, 215, and/or 500, may utilize one or more components, such as the processor 502, the memory 504, the sidelink communication module 508, the transceiver 510, the modem 512, and the one or more antennas 516, to execute the steps of method 1000. The method 1000 may employ similar mechanisms as in the schemes 400, 700, and/or 800 discussed above with respect to FIGS. 4, 7, and/or 8, respectively. As illustrated, the method 1000 includes a number of enumerated steps, but aspects of the method 1000 may include additional steps before, after, and in between the enumerated steps. In some aspects, one or more of the enumerated steps may be omitted or performed in a different order.

In the method 1000, a sidelink UE (e.g., the UEs 115, 215, and/or 500) may perform CAT4 LBT at block 1010 to contend for a COT (e.g., the COT 402) for sidelink communication concurrent with monitoring for a COT sharing indicator (e.g., the COT indication signal 430) at block 1040. In this regard, at block 1010, a sidelink UE (e.g., the UEs 115, 215, and/or 500) performs a CAT4 LBT in a shared channel (e.g., the frequency band 301). For instance, the sidelink UE may perform the LBT in a LBT gap similar to the LBT gap 410 within a duration of a sidelink frame (e.g., the sidelink frame 404). The sidelink UE may utilize the scheme 400, 700, and/or 800 to identify a sidelink frame duration when the sidelink UE may perform the CAT4 LBT. In some instances, the sidelink UE may utilize one or more components, such as the processor 502, the sidelink communication module 508, the transceiver 510, the modem 512, and the one or more antennas 516, to identify a sidelink frame duration when the sidelink UE is allowed to perform an LBT and perform the LBT by listening to the channel and measuring channel signal energy and compare the measured channel signal energy to a threshold to determine whether the LBT is a pass (e.g., when the measured channel signal energy is below the threshold) or a failure (e.g., when the channel signal energy is above the threshold).

At block 1020, the sidelink UE determines whether the LBT is a pass. In some instances, the sidelink UE may utilize one or more components, such as the processor 502, the sidelink communication module 508, the transceiver 510, the modem 512, and the one or more antennas 516, to determine whether the LBT is a pass by comparing a channel signal energy measurement to a threshold, determine that the LBT is a pass if the channel signal energy measurement is below the threshold, and determine that the LBT fails when the channel signal energy measurement is above the threshold. If the sidelink UE determines that the LBT is a pass, the sidelink UE proceeds to the block 1030.

At block 1030, the sidelink UE terminates the COT sharing indicator monitoring at block 1040 and transmits in the channel during the COT (e.g., the COT 402) acquired from the CAT4 LBT. In some instances, the sidelink UE may utilize one or more components, such as the processor 502, the sidelink communication module 508, the transceiver 510, the modem 512, and the one or more antennas 516, to transmit SCI (e.g., the SCI 330, 332, 730, and/or 830) and sidelink data in sidelink resource (e.g., the sidelink resource 306) within the COT. The sidelink UE may also transmits a COT indication signal (e.g., the COT indication signal 430) to indicate that another sidelink UE may share the COT.

Returning to block 1020, if the sidelink UE determines that the LBT fails, the sidelink UE proceeds to block 1025. At block 1025, the sidelink UE refrains from transmitting in the channel.

At block 1040, the sidelink UE monitors for a COT sharing indicator in the channel. For instance, the sidelink UE may utilize one or more components, such as the processor 502, the sidelink communication module 508, the transceiver 510, the modem 512, and the one or more antennas 516, to receive a signal from the channel and perform demodulation and/or decoding on the received signal to search for a COT indication signal and/or COT sharing indicator.

At block 1050, the sidelink UE determines whether a COT sharing indicator (e.g., the COT indication signal 430) is detected from the monitoring. For instance, the sidelink UE may utilize one or more components, such as the processor 502, the sidelink communication module 508, the transceiver 510, the modem 512, and the one or more antennas 516, to determine whether a COT sharing indicator is decoded from the received signal. If the sidelink UE determines that no COT sharing indicator is detected, the sidelink UE returns to the block 1040. If the sidelink UE determines that a COT sharing indicator is detected, the sidelink UE proceeds to block 1060.

At block 1060, the sidelink UE terminates the CAT4 LBT at block 1010 and transmits in the channel the COT (e.g., the COT 402) shared by another sidelink UE based on the COT sharing. In some instances, the sidelink UE may utilize one or more components, such as the processor 502, the sidelink communication module 508, the transceiver 510, the modem 512, and the one or more antennas 516, to decode information associated with the shared COT from the COT sharing indicator, determine whether a sidelink resource (e.g., the sidelink resource 306) is available in the shared COT, and transmit SCI (e.g., the SCI 330, 332, 730, and/or 830) and sidelink data in am available sidelink resource within the COT. In some instances, the sidelink UE may perform a CAT1 LBT (e.g., no LBT) or a CAT2 LBT prior to transmitting in the shared COT.

Figure 11:
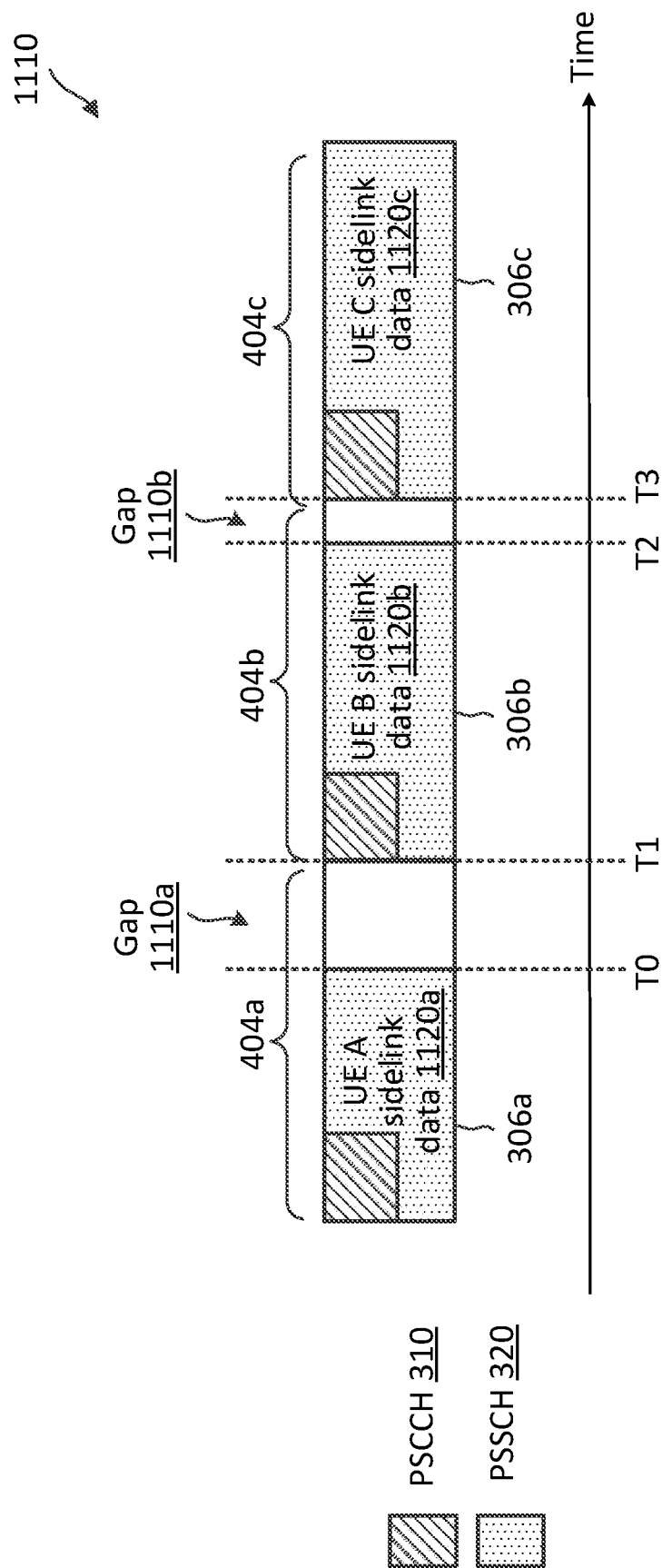
FIG. 11 illustrates a sidelink communication scheme with flexible LBT gaps according to some aspects of the present disclosure.

FIG. 11 illustrates a sidelink communication scheme 1100 with flexible LBT gaps according to some aspects of the present disclosure. The scheme 1100 may be employed by UEs such as the UEs 115, 215, and/or 500 in a network such as the networks 100 and/or 200. In particular, sidelink UEs may employ the scheme 1100 to communicate sidelink over a shared radio frequency band (e.g., in a shared spectrum or an unlicensed spectrum). The shared radio frequency band may be shared by multiple RATs as discussed in FIG. 2. In FIG. 11, the x-axis represents time in some arbitrary units. The scheme 1100 is described using a similar sidelink resource structure as in the scheme 300 and a similar sidelink frame and LBT gap configuration as in the scheme 400 and may use the same reference numerals as in FIGS. 3 and 4 for simplicity's sake. Additionally, the pattern-filled boxes represent signal transmissions in corresponding portions of the sidelink resources 306 and the empty-filled boxes represent no transmission in corresponding portions of the sidelink resources 306.

In the scheme 1100, a sidelink UE may shorten the duration of a sidelink transmission to provide a time gap at the end of the sidelink resource. The time gap allows a sidelink UE intending to transmit in a next sidelink frame to perform an LBT. In the illustrated example of FIG. 11, a sidelink UE A (e.g., the UEs 115, 215, and/or 500) transmits SCI and sidelink data 1120a in a sidelink resource 306 during the sidelink frame 404a. The sidelink UE A utilizes a shortened duration for the sidelink data 1120a transmission to provide a gap 1110a at the end of the sidelink resource 306a (e.g., between time T0 and T1). For instance, the sidelink UE A may not transmit in the last 1 or 2 symbols of the sidelink resource 306a. The gap 1110a may allow a sidelink UE B to perform an LBT (e.g., a CAT4 LBT) prior transmitting in a sidelink resource 306b in the next sidelink frame 404b. For instance, after passing an LBT in the gap 1110a, the sidelink UE B may transmit SCI and sidelink data 1120b in the sidelink resource 306b in the sidelink frame 404b. Similarly, the sidelink UE B utilizes a shortened duration for the sidelink data 1120b transmission to provide a gap 1110b at the end of the sidelink resource 306b (e.g., between time T2 and T3). The gap 1110b may allow a sidelink UE C to perform an LBT (e.g., a CAT4 LBT) prior transmitting in a sidelink resource 306c in the sidelink frame 404c. After passing an LBT in the gap 1110b, the sidelink UE C may transmit SCI and sidelink data 1120c in the sidelink resource 306c in the sidelink frame 404c.

The duration of a gap 1110 may vary depending on various factors. In some aspects, the lower the priority of the PSSCH data, the wider the gap 1110. In the illustrated example of FIG. 11, the sidelink UE A's sidelink data 1120a may have a lower priority than the sidelink UE B's sidelink data 1120b, and thus the gap 1110a may have a longer duration than the gap 1110b. In some aspects, a sidelink UE may determine the duration of a gap 1110 to leave at the end of a sidelink resource 306 based on a CBR measurement (e.g., the CBR 920). The sidelink UE may determine a CBR measurement using mechanisms described above with respect to FIG. 9. The higher the CBR, the longer the duration of the gap 1110. Thus, the gaps 1110 may be different at different times. In some aspects, the sidelink UE may receive a CBR, for example, a regional CBR, from a BS as described above with respect to FIG. 9. In some aspects, the sidelink UE may determine a gap 1110 based on a CBR measurement determined by the sidelink UE or a regional CBR value received from a BS and adjust the gap 1110 based on a priority of the sidelink data being transmitted in the sidelink resource 306.

Figure 12:
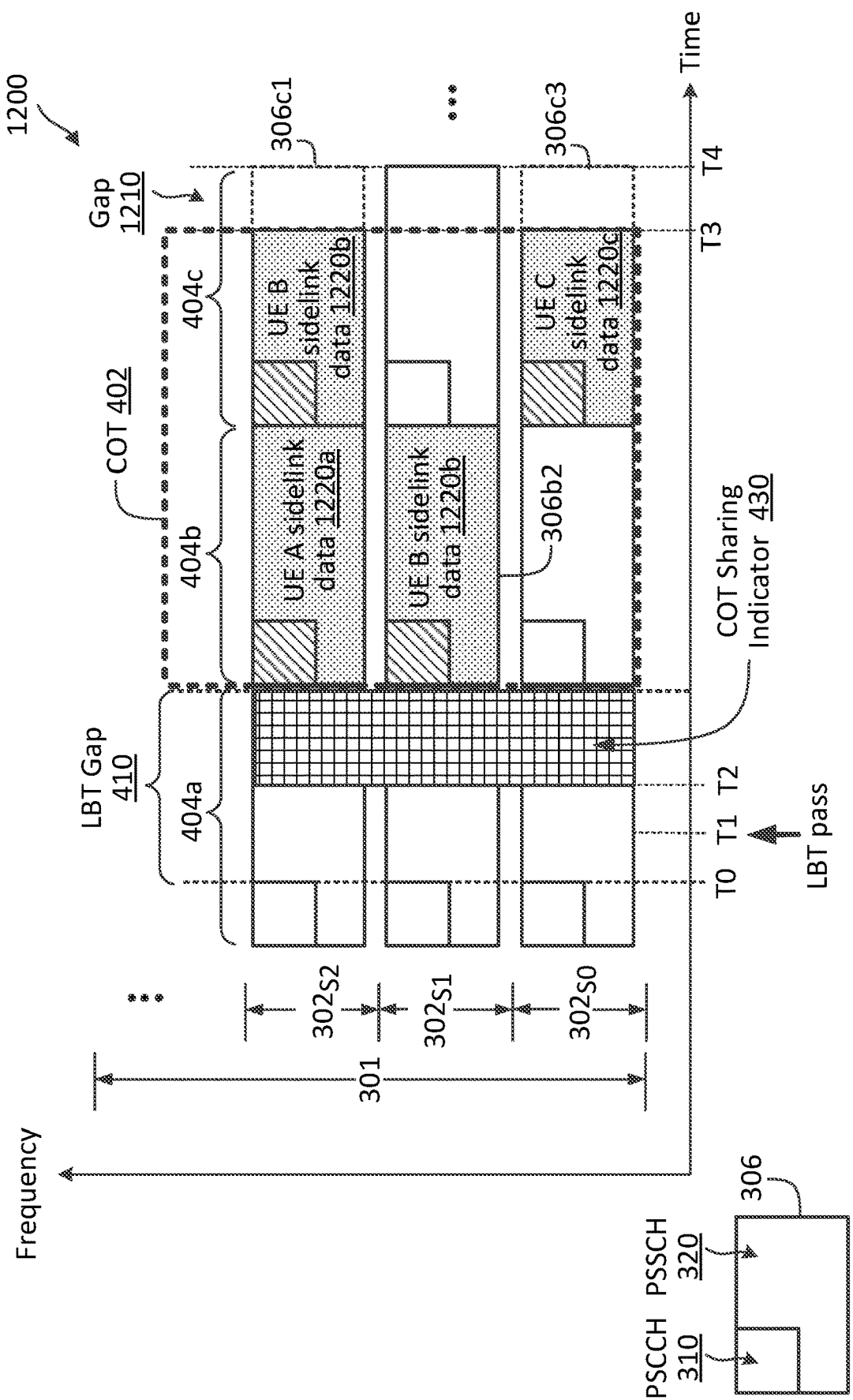
FIG. 12 illustrates a sidelink communication scheme with flexible LBT gaps according to some aspects of the present disclosure.

FIG. 12 illustrates a sidelink communication scheme 1200 with flexible LBT gaps according to some aspects of the present disclosure. The scheme 1200 may be employed by UEs such as the UEs 115, 215, and/or 500 in a network such as the networks 100 and/or 200. In particular, sidelink UEs may employ the scheme 1200 to communicate sidelink over a shared radio frequency band (e.g., in a shared spectrum or an unlicensed spectrum). The shared radio frequency band may be shared by multiple RATs as discussed in FIG. 2. In FIG. 12, the x-axis represents time in some arbitrary units, and the y-axis represents frequency in some arbitrary units. The scheme 1200 is described using a similar sidelink resource structure as in the scheme 300 and a similar sidelink frame and LBT gap configuration as in the scheme 400 and may use the same reference numerals as in FIGS. 3 and 4 for simplicity's sake. Additionally, the pattern-filled boxes represent signal transmissions in corresponding sidelink resources 306 and the empty-filled boxes represent no transmission in corresponding sidelink resources 306.

In the scheme 1200, a sidelink UE (e.g., the UEs 115, 215, and/or 500) may use similar mechanisms as discussed above in the schemes 400, 700, 800, and/or 900 discussed above with respect to FIGS. 4, 7, 8, and/or 9 to perform an LBT for acquiring a sidelink COT (e.g., the COT 402) and share the acquired COT with other sidelink UE in the same sidelink system. For instance, the sidelink UE A may perform an LBT within the sidelink frame 404a in the LBT gap 410 to acquire a COT 402 in the frequency band 301. The sidelink UE A may apply similar rules as in the schemes 400, 700, and/or 800 to determine whether an LBT may be performed within the duration of a sidelink frame 404a. After passing the LBT (e.g., at time T1), the sidelink UE A may stars a COT 402. The sidelink UE A may determine to share the COT 402 with other sidelink UEs. The sidelink UE A may determine a time when the sidelink UE A may start to transmit a COT indication signal 430 to share the COT 402 with other sidelink UEs using the scheme 900. The COT 402 may include a number of sidelink frames 404, for example, including the sidelink frames 404b and 404c. In some instances, the sidelink UE A may be a facilitator UE. The sidelink UE A may or may not transmit in the COT 402 as discussed above in the scheme 400 with reference to FIG. 4. In some other instances, the sidelink UE A may utilize the sidelink resources in the COT 402 to transmit sidelink data 1220a, for example, in a sidelink resource 306 in the frequency subband $302_{S2}$ during the sidelink frame 404b.

The scheme 1200 may additionally allow a sidelink UE to start monitoring for a COT sharing opportunity in advance of an intended sidelink transmission. In the illustrated example of FIG. 12, a sidelink UE C intending to transmit in the sidelink resource 306c3 in the frequency subband $306_{S0}$ during the sidelink frame 404c may start to monitor for a COT indication signal 430 in the sidelink frame 404a, which is 2 sidelink frames 404 before the sidelink frame 404c. In general, a sidelink UE may start to monitor for a COT sharing opportunity any number of sidelink frames 404 (e.g., about 1, 3, 4 or more) ahead of a sidelink frame 404 where sidelink data is to be transmitted. The sidelink UE C may detect the COT indication signal 430 in the sidelink frame 404a from the monitoring. The COT indication signal 430 may indicate that the COT 402 spans two sidelink frames 404 (including the sidelink frames 404b and the sidelink frames 404c). Accordingly, the sidelink UE C may identify the sidelink frames 404b and 404c in the COT 402 based on the COT indication signal 430. The sidelink UE C may determine that the sidelink resource 306c3 at frequency subband $302_{S0}$ in the sidelink frame 404c is available for transmission, for example, based on SCI sensing. Thus, the sidelink UE C may transmit SCI and sidelink data 1220c in the sidelink resource 306c3.

A sidelink UE B may also monitor for a COT indication signal in the sidelink frame 404a and may detect the COT indication signal 430. The sidelink UE B may determine that the sidelink resource 306b2 at frequency subband $302_{S1}$ in the sidelink frame 404b and the sidelink resource 306c1 at frequency subband $302_{S2}$ in the sidelink frame 404c are available for transmission, for example, based on SCI sensing. Thus, the sidelink UE B may transmit SCI and sidelink data 1220b in the sidelink resources 306b2 and 306c1. In some instances, the COT indication signal 430 may indicate a CAT1 LBT mode for the sidelink frame 404b and a CAT2 LBT mode for the sidelink frame 404c. Thus, the sidelink UE B may transmit in the sidelink resource 306b2 without any LBT and may transmit in the sidelink resource 306c1 after passing a CAT2 LBT. The CAT2 LBT may start at the start of the sidelink frame 404*c*. Similarly, the sidelink UE C may transmit in the sidelink resource 306*c*3 after passing a CAT2 LBT (that begins at the start of the sidelink frame 404*c*).

The scheme 1200 may further utilize the mechanisms described in the scheme 1100 with respect to FIG. 11 to shorten the duration of a sidelink transmission in the last sidelink frame of a COT. As shown, the sidelink frame 404*c* is the last sidelink frame 404 in the COT 402. The sidelink UE B and the sidelink UE C may be aware that the sidelink frame 404*c* is the last sidelink frame 404 in the COT 402 based on indication in the COT indication signal 430. Thus, the sidelink UE B shortens the duration of the sidelink data 1220*b* transmission in the sidelink resource 306*c*1, for example, completing the sidelink data 1220*b* transmission at time T3 instead of at the end of the sidelink frame 404*c* (at time T4), to provide a gap 1210 for LBT. Similarly, the sidelink UE C shortens the duration of the sidelink data 1220*c* transmission in the sidelink resource 306*c*3, for example, completing the sidelink data 1220*b* transmission at time T3.

In some aspects, the COT indication signal 430 may include an indication of a last sidelink frame 404 in a COT 402 and the sidelink UE (e.g., the sidelink UE B and/or the sidelink C) that utilizes a sidelink resource 306 in the last sidelink frame 304 may determine when to end the sidelink transmission, for example, based on the priority of the sidelink data transmission and/or a CBR measurement, and/or a regional CBR value as discussed above in the scheme 1100 with reference to FIG. 11. Since sidelink data transmissions (e.g., the sidelink data 1220*b* and 1220*c*) over the different frequency subbands 302 in the last sidelink frame 404 in a COT 402 may have different priorities and/or sidelink UEs (e.g., the sidelink UE B and the sidelink UE C) using the last sidelink frame 404 may have different CBR measurements. Thus, the sidelink data transmissions in the last sidelink frame 404*c* may end at different times, for example, in a zig-zag manner. In some aspects, the sidelink UE A may include an indication of a COT end time (e.g., time T3) in the COT indication signal 430 and the sidelink UE B and the sidelink UE C may shorten the sidelink data transmission in the last sidelink frame 404*c* based on the indicated COT end time.

In some aspects, a sidelink system may utilize a CR metric for congestion control. A CR is a metric indicating a number of subchannels (e.g., the frequency subbands 302) occupied by a sidelink UE for transmission divided by a total number of subchannels in the resource pool. The CR metric can be computed for a certain number of time intervals or subframes (e.g., the sidelink frames 404). The CR can provide an indication of channel utilization by the sidelink UE. In some instances, a sidelink UE may compute a CR by counting a number of subchannels in the resource pool where the sidelink UE has an active transmission (e.g., a subchannel count) over a time interval and dividing the subchannel count by the total number of subchannels in the resource pool. In some instances, the sidelink UE may be configured, for example, by a serving BS, to report a CR to the BS.

In some aspects, when a sidelink system utilizes LBT as shown in the schemes 400, 700, 800, 900, 1100, and/or 1200 and/or the method 1000, a sidelink UE (e.g., the UEs 115, 215, and/or 400) may determine an LBT-aware CR. In this regard, the sidelink UE may consider the number of subchannels or frequency subbands (e.g., the frequency subbands 302) where the sidelink UE passes an LBT when computing the CR. In this regard, the sidelink UE may adjust the CR by configuring the denominator of the CR based on a total number of frequency subbands in which the sidelink UE passed an LBT instead of a total number of frequency subbands in the resource pool. In other words, the LBT-aware CR considers the subchannels that are available (with an LBT pass) to the sidelink UE, and not the subchannels that are unavailable to the sidelink UE. For instance, a sidelink resource pool (e.g., the sidelink resource pool 408) may have 10 frequency subbands, and the sidelink UE may have pass LBT in 5 frequency subbands. To compute the LBT-aware CR, the sidelink UE may set the denominator of the LBT-aware CR to 5. The LBT-aware CR may provide an indication of intra-system or intra-operator or intra-technology blocking (e.g., blocked by another sidelink UE within the same sidelink system). In some instances, the sidelink UE may utilize one or more components, such as the processor 502, the sidelink communication module 508, the transceiver 510, the modem 512, and the one or more antennas 516, to determine the number of subbands that are available to the sidelink UE (e.g., with an LBT pass) and a number of available subbands that are occupied by the sidelink UE and compute the CR based on the count and the total number of available frequency subbands.

Figure 13:
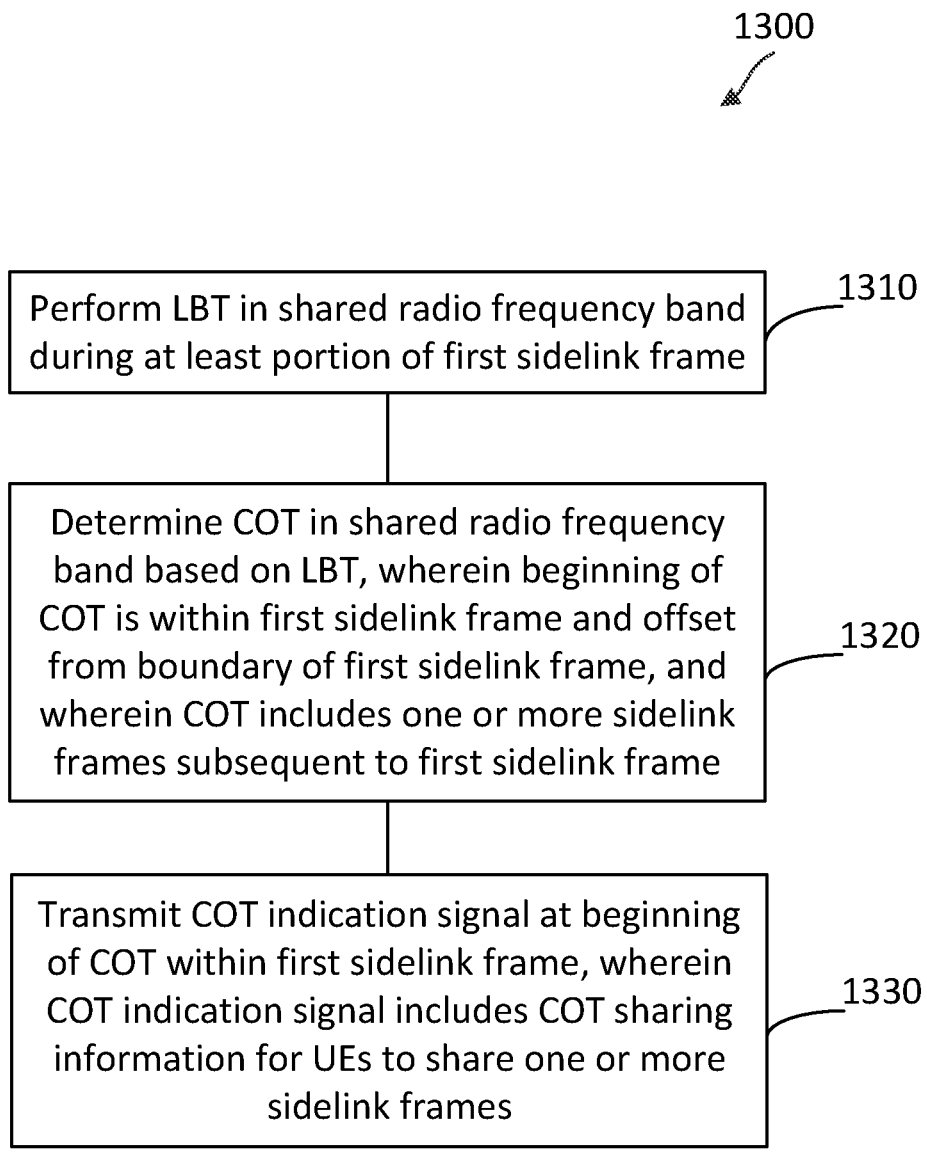
FIG. 13 is a flow diagram of a sidelink communication method according to some aspects of the present disclosure.

FIG. 13 is a flow diagram of a sidelink communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as the UEs 115, 215, and/or 500, may utilize one or more components, such as the processor 502, the memory 504, the sidelink communication module 508, the transceiver 510, the modem 512, and the one or more antennas 516, to execute the steps of method 1300. The method 1300 may employ similar mechanisms as in the schemes 400, 700, 800, 900, 1100, and/or 1200 discussed above with respect to FIGS. 4, 7, 8, 9, 11, and/or 12, respectively and/or the method 1000 discussed above with respect to FIG. 10. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, a first UE (e.g., the UEs 115, 215, and/or 500) performs an LBT in a shared radio frequency band (e.g., the shared radio frequency band 301) during at least a portion of a first sidelink frame (e.g., the sidelink frames 404). For instance, the first UE may perform the LBT by measuring signal energy in the shared radio frequency band during at least a portion of the first sidelink frame, comparing the channel signal measurement to a threshold, determining that the LBT is a pass (e.g., the channel is available) if the channel signal measurement is below the threshold, and determining that the LBT fails (e.g., channel is busy) if the channel signal measurement is above the threshold. In some instances, the first UE may utilize one or more components, such as the processor 502, the sidelink communication module 508, the transceiver 510, the modem 512, and the one or more antennas 516, to perform the LBT in the shared radio frequency band during at least the portion of the first sidelink frame. In some instances, the first UE may be a facilitator UE in a sidelink system as discussed above.

At block 1320, the first UE determines a COT (e.g., the COT 402) in the shared radio frequency band based on the LBT, where a beginning of the COT is within the first sidelink frame and offset from a boundary of the first sidelink frame. The COT includes one or more sidelink frames subsequent to the first sidelink frame. For instance, the first UE may determine that a COT is acquired in the shared radio frequency band when the LBT at block 1310 is a pass (based on the energy detection threshold comparison). The LBT may pass at a time within the first sidelink frame and before the start of a next sidelink frame. The COT may begin at the time when the LBT passes. In some instances, the first UE may utilize one or more components, such as the processor 502, the sidelink communication module 508, the transceiver 510, the modem 512, and the one or more antennas 516, to determine the COT based on the LBT.

At block 1330, the first UE transmits, in the shared radio frequency band, a COT indication signal at the beginning of the COT within the first sidelink frame. The COT indication signal (e.g., the COT indication signal 430) includes COT sharing information for UEs to share the one or more sidelink frames. In some instances, the first UE may utilize one or more components, such as the processor 502, the sidelink communication module 508, the transceiver 510, the modem 512, and the one or more antennas 516, to transmit the COT indication signal in the shared radio frequency band at the beginning of the COT.

In some aspects, the COT indication signal may indicate a number of sidelink frames in the COT. In some aspects, the COT indication signal may indicate that a last sidelink frame of the COT is shortened to provide an LBT gap. In some aspects, the COT may include a plurality of frequency subbands (e.g., the frequency subbands 302) within the shared radio frequency band and the COT indication signal may indicate information associated with the plurality of frequency subbands. In some aspects, each sidelink frame of the COT may include a sidelink resource (e.g., the sidelink resource 306) in each frequency subband of the plurality of frequency subbands, and each sidelink resource may include a PSCCH (e.g., the PSCCH 310) and a PSSCH (e.g., the PSSCH 320). In some aspects, the COT indication signal indicates an LBT mode (e.g., a CAT1 LBT or a CAT2 LBT) for the UEs to transmit in the one or more sidelink frames.

In some aspects, the first UE may also determine an instance for transmitting the COT indication signal based on a CBR value, a duration of the COT (e.g., the COT 402) acquired based on the LBT performed at block 1320, and/or a number of LBT failures associated with predetermined LBT starting points (e.g., the LBT starting points 802) as discussed above in the scheme 900 with reference to FIG. 9. In some instances, the first UE may utilize one or more components, such as the processor 502, the sidelink communication module 508, the transceiver 510, the modem 512, and the one or more antennas 516, to determine the instance for transmitting the COT indication signal based on the CBR value, the duration of the COT, and/or the number of LBT failures.

Figure 14:
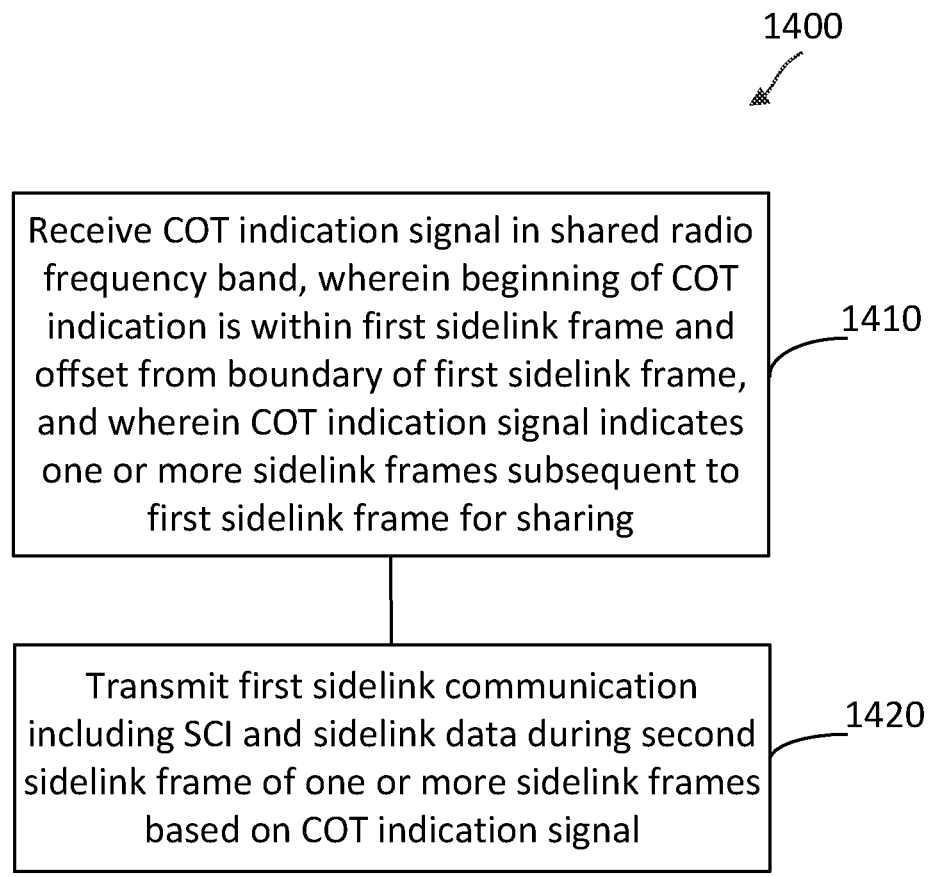
FIG. 14 is a flow diagram of a sidelink communication method according to some aspects of the present disclosure.

FIG. 14 is a flow diagram of a sidelink communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as the UEs 115, 215, and/or 500, may utilize one or more components, such as the processor 502, the memory 504, the sidelink communication module 508, the transceiver 510, the modem 512, and the one or more antennas 516, to execute the steps of method 1400. The method 1400 may employ similar mechanisms as in the schemes 400, 700, 800, 900, 1100, and/or 1200 discussed above with respect to FIGS. 4, 7, 8, 9, 11, and/or 12, respectively and/or the method 1000 discussed above with respect to FIG. 10. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1410, a first UE receives a COT indication signal (e.g., the COT indication signal 430) in a shared radio frequency band (e.g., the shared radio frequency band 301), where a beginning of the COT indication signal is within a first sidelink frame (e.g., the sidelink frames 404) and offset from a boundary of the first sidelink frame. The COT indication signal indicates one or more sidelink frames subsequent to the first sidelink frame for sharing. In some instances, the first UE may utilize one or more components, such as the processor 502, the sidelink communication module 508, the transceiver 510, the modem 512, and the one or more antennas 516, to receive the COT indication signal.

At block 1420, the first UE transmits, to a second UE, a first sidelink communication including SCI (e.g., the SCI 330, 332, 730, and/or 830) and sidelink data (e.g., the sidelink data 420, 1120, and/or 1220) during a second sidelink frame of the one or more sidelink frames based on the COT indication signal. In some instances, the first UE may utilize one or more components, such as the processor 502, the sidelink communication module 508, the transceiver 510, the modem 512, and the one or more antennas 516, to transmit the first sidelink communication including the SCI and the sidelink data during a second sidelink frame of the one or more sidelink frames based on the COT indication signal.

In some aspects, the COT indication signal may indicate a plurality of frequency subbands (e.g., the frequency subbands 302) within the shared radio frequency band. The first UE may transmit the first sidelink communication at block 1420 in a first frequency subband of the plurality of frequency subbands during the second sidelink frame based on the COT indication signal.

In some aspects, the COT indication signal may indicate an LBT mode (e.g., a CAT1 LBT or a CAT2 LBT) for the one or more sidelink frames. The first UE may further perform an LBT based on the LBT mode before transmitting the first sidelink communication.

In some aspects, the COT indication signal may indicate that a last sidelink frame of the COT is shortened to provide an LBT gap. The first UE may transmit a shortened sidelink communication at the block 1420 based on the second sidelink frame being the last sidelink frame of the COT. In some aspects, an end time of the shortened sidelink communication is based on a priority of the first sidelink communication and/or a channel busy ratio (CBR) value as discussed above in the schemes 1100 and/or 1200 with reference to FIGS. 11 and/or 12, respectively.

In some aspects, the first UE may further monitor for the COT indication signal in the shared radio frequency band and perform an LBT in the shared radio frequency band concurrent with the monitoring as discussed above in the method 1000 with reference to FIG. 10. The first UE may receive the COT indication signal at block 1410 based on the monitoring. In some instances, the first UE may utilize one or more components, such as the processor 502, the sidelink communication module 508, the transceiver 510, the modem 512, and the one or more antennas 516, to monitor for the COT indication signal concurrent with performing the LBT. For instance, the first UE may configure the processor to operate on two parallel threads, one for performing the LBT and another one for monitoring for the COT indication signal.

Further aspects of the present disclosure include a method of wireless communication. The method of wireless communication includes performing, by a first user equipment (UE), a listen-before-talk (LBT) in a shared radio frequency band during at least a portion of a first sidelink frame. The method of wireless communication also includes determining, by the first UE, a channel occupancy time (COT) in the shared radio frequency band based on the LBT, where a beginning of the COT is within the first sidelink frame and offset from a boundary of the first sidelink frame, and where the COT includes one or more sidelink frames subsequent to the first sidelink frame; and transmitting, by the first UE in the shared radio frequency band, a COT indication signal at the beginning of the COT within the first sidelink frame, where the COT indication signal includes COT sharing information for UEs to share the one or more sidelink frames.

The method may also include one or more of the following features. For instance, the method may include receiving, by the first UE, a synchronization signal; and identifying, by the first UE, the boundary of the first sidelink frame based on the synchronization signal. The COT indication signal indicates a number of sidelink frames in the COT. The COT indication signal indicates that a last sidelink frame of the COT is shortened to provide an LBT gap. The COT includes a plurality of frequency subbands within the shared radio frequency band, and where the COT indication signal indicates information associated with the plurality of frequency subbands. Each sidelink frame of the COT includes a sidelink resource in each frequency subband of the plurality of frequency subbands, and where each sidelink resource includes a physical sidelink control channel (PSCCH) and a physical sidelink shared channel (PSSCH). The performing the LBT includes performing, by the first UE, a category 4 LBT aCRoss the plurality of frequency subbands. The plurality of frequency subbands is associated with a LBT subband size in the shared radio frequency band. The shared radio frequency band is a 5 gigahertz (ghz) band, and where the LBT subband size is 20 MHz. The COT indication signal indicates an LBT mode for the UEs to transmit in the one or more sidelink frames. The LBT mode includes at least one of a category 1 LBT or a category 2 LBT. The performing the LBT is based on the monitoring. The performing the LBT is in response to a determination that no SCI is detected by the monitoring. The monitoring includes detecting, by the first UE, the SCI indicating a reservation in a frequency subband within the shared radio frequency band; and the performing the LBT is in response to an override of the SCI based on a priority of the reservation. The monitoring includes detecting, by the first UE, the SCI in a frequency subband within the shared radio frequency band; and the performing the LBT is in response to an override of the SCI based on a number of LBT failures exceeding a threshold. The number of LBT failures is associated with predetermined LBT starting points associated with a sidelink frame boundary. The method may include determining, by the first UE, an instance for transmitting the COT indication signal based on a channel busy ratio (CBR) value. The CBR value is associated with a plurality of UEs in a geographical area, the plurality of UEs including the first UE. The method may include determining, by the first UE, an instance for transmitting the COT indication signal based on at least one of a duration of the COT or an LBT parameter associated with the LBT. The method may include determining, by the first UE, an instance for transmitting the COT indication signal based on a number of LBT failures associated with predetermined LBT starting points. The method may include transmitting, by the first UE to a second UE, a sidelink communication during a second sidelink frame of the one or more sidelink frames of the COT. The second sidelink frame is a last sidelink frame of the COT; and the transmitting the sidelink communication includes transmitting, by the first UE to the second UE, a shortened sidelink communication in the second sidelink frame to provide an LBT gap. The performing the LBT includes performing, by the first UE, the LBT in one or more frequency subbands within the shared radio frequency band; and the method further includes transmitting, by the first UE, a channel access occupancy ratio (CR) report based on a number of frequency subbands of the one or more frequency subbands having an LBT pass.

Further aspects of the present disclosure include a method of wireless communication. The method of wireless communication includes receiving, by a first user equipment (UE), a channel occupancy time (COT) indication signal in a shared radio frequency band, where a beginning of the COT indication signal is within a first sidelink frame and offset from a boundary of the first sidelink frame, and where the COT indication signal indicates one or more sidelink frames subsequent to the first sidelink frame for sharing; and transmitting, by the first UE to a second UE, a first sidelink communication including SCI and sidelink data during a second sidelink frame of the one or more sidelink frames based on the COT indication signal.

The method may also include one or more of the following features. For instance, the method may include where the COT indication signal indicates a plurality of frequency subbands within the shared radio frequency band; and the transmitting includes transmitting, by the first UE to the second UE, the first sidelink communication in a first frequency subband of the plurality of frequency subbands during the second sidelink frame based on the COT indication signal. The COT indication signal indicates a listen-before-talk (LBT) mode for the one or more sidelink frames. The LBT mode includes at least one of a category 1 LBT or a category 2 LBT. The method may include performing, by the first UE, an LBT based on the LBT mode before transmitting the first sidelink communication. The COT indication signal indicates a COT including the one or mode sidelink frames and a last sidelink frame of the COT is shortened to provide an LBT gap. The transmitting includes transmitting, by the first UE to the second UE, a shortened sidelink communication in the second sidelink frame based on the second sidelink frame being the last sidelink frame of the COT. An end time of the shortened sidelink communication is based on a priority of the first sidelink communication. An end time of the shortened sidelink communication is based on a channel busy ratio (CBR) value. The method may include receiving, by the first UE, an indication of the CBR value, the CBR value associated with a plurality of UEs in a geographical area, the plurality of UEs including the first UE. The receiving the COT indication signal is based on the monitoring. The performing the LBT is based on a sidelink frame boundary.

Further aspects of the present disclosure include an apparatus including a processor configured to perform listen-before-talk (LBT) in a shared radio frequency band during at least a portion of a first sidelink frame; and determine a channel occupancy time (COT) in the shared radio frequency band based on the LBT, where a beginning of the COT is within the first sidelink frame and offset from a boundary of the first sidelink frame, and where the COT includes one or more sidelink frames subsequent to the first sidelink frame; and a transceiver configured to transmit, in the shared radio frequency band, a COT indication signal at the beginning of the COT within the first sidelink frame, where the COT indication signal includes COT sharing information for UEs to share the one or more sidelink frames.

The apparatus may also include one or more of the following features. For instance, the apparatus may include where the transceiver is further configured to receive a synchronization signal; and the processor is further configured to identify the boundary of the first sidelink frame based on the synchronization signal. The COT indication signal indicates a number of sidelink frames in the COT. The COT indication signal indicates that a last sidelink frame of the COT is shortened to provide an LBT gap. The COT includes a plurality of frequency subbands within the shared radio frequency band, and where the COT indication signal indicates information associated with the plurality of frequency subbands. Each sidelink frame of the COT includes a sidelink resource in each frequency subband of the plurality of frequency subbands, and where each sidelink resource includes a physical sidelink control channel (PSCCH) and a physical sidelink shared channel (PSSCH). The processor configured to perform the LBT is configured to perform a category 4 LBT aCRoss the plurality of frequency subbands. The plurality of frequency subbands is associated with a LBT subband size in the shared radio frequency band. The shared radio frequency band is a 5 gigahertz (ghz) band, and where the LBT subband size is 20 MHz. The COT indication signal indicates an LBT mode for the UEs to transmit in the one or more sidelink frames. The LBT mode includes at least one of a category 1 LBT or a category 2 LBT. The processor is further configured to monitor for sidelink control information (SCI) during the first sidelink frame; and the processor configured to perform the LBT is configured to perform the LBT based on the monitoring. The processor configured to perform the LBT is configured to perform the LBT in response to a determination that no SCI is detected by the monitoring. The processor configured to monitor the SCI is configured to detect the SCI indicating a reservation in a frequency subband within the shared radio frequency band; and the processor configured to perform the LBT is configured to perform the LBT in response to an override of the SCI based on a priority of the reservation. The processor configured to monitor the SCI is configured to detect the SCI in a frequency subband within the shared radio frequency band; and the processor configured to perform the LBT is configured to performing the LBT is in response to an override of the SCI based on a number of LBT failures exceeding a threshold. The number of LBT failures is associated with predetermined LBT starting points associated with a sidelink frame boundary. The processor is further configured to determine an instance for transmitting the COT indication signal based on a channel busy ratio (CBR) value. The transceiver is further configured to receive an indication of the CBR value, where the CBR value is associated with a plurality of UEs in a geographical area, the plurality of UEs including the apparatus. The processor is further configured to determine an instance for transmitting the COT indication signal based on at least one of a duration of the COT or an LBT parameter associated with the LBT. The processor is further configured to determine an instance for transmitting the COT indication signal based on a number of LBT failures associated with predetermined LBT starting points. The transceiver is further configured to transmit, to a second UE, a sidelink communication during a second sidelink frame of the one or more sidelink frames of the COT. The second sidelink frame is a last sidelink frame of the COT; and the transceiver configured to transmit the sidelink communication is configured to transmit, to the second UE, a shortened sidelink communication in the second sidelink frame to provide an LBT gap. The processor configured to perform the LBT is configured to perform the LBT in one or more frequency subbands within the shared radio frequency band; and the transceiver is further configured to transmit a channel access occupancy ratio (CR) report based on a number of frequency subbands of the one or more frequency subbands having an LBT pass.

Further aspects of the present disclosure include an apparatus including a transceiver configured to receive a channel occupancy time (COT) indication signal in a shared radio frequency band, where a beginning of the COT indication signal is within a first sidelink frame and offset from a boundary of the first sidelink frame, and where the COT indication signal indicates one or more sidelink frames subsequent to the first sidelink frame for sharing; and transmit, to a second UE, a first sidelink communication including SCI and sidelink data during a second sidelink frame of the one or more sidelink frames based on the COT indication signal.

The apparatus may also include one or more of the following features. For instance, the apparatus may include where the COT indication signal indicates a plurality of frequency subbands within the shared radio frequency band; and the transceiver configured to transmit the first sidelink communication is configured to transmit, to the second UE, the first sidelink communication in a first frequency subband of the plurality of frequency subbands during the second sidelink frame based on the COT indication signal. The COT indication signal indicates a listen-before-talk (LBT) mode for the one or more sidelink frames. The LBT mode includes at least one of a category 1 LBT or a category 2 LBT. The apparatus may include a processor configured to perform an LBT based on the LBT mode before transmitting the first sidelink communication. The COT indication signal indicates a COT including the one or mode sidelink frames and a last sidelink frame of the COT is shortened to provide an LBT gap. The transceiver configured to transmit the first sidelink communication is configured to transmit, to the second UE, a shortened sidelink communication in the second sidelink frame based on the second sidelink frame being the last sidelink frame of the COT. An end time of the shortened sidelink communication is based on a priority of the first sidelink communication. An end time of the shortened sidelink communication is based on a channel busy ratio (CBR) value. The transceiver is further configured to receive an indication of the CBR value, the CBR value associated with a plurality of UEs in a geographical area, the plurality of UEs including the first UE. The transceiver configured to receive the COT indication signal is configured to receive the COT indication signal based on the monitoring. The processor configured to perform the LBT is configured to perform the LBT based on a sidelink frame boundary.

Further aspects of the present disclosure include a non-transitory computer-readable medium having program code recorded thereon. The non-transitory computer-readable medium includes code for causing a first user equipment (UE) to perform listen-before-talk (LBT) in a shared radio frequency band during at least a portion of a first sidelink frame. The non-transitory computer-readable medium also includes code for causing the first UE to determine a channel occupancy time (COT) in the shared radio frequency band based on the LBT, where a beginning of the COT is within the first sidelink frame and offset from a boundary of the first sidelink frame, and where the COT includes one or more sidelink frames subsequent to the first sidelink frame; and code for causing the first UE to transmit, in the shared radio frequency band, a COT indication signal at the beginning of the COT within the first sidelink frame, where the COT indication signal includes COT sharing information for UEs to share the one or more sidelink frames.

The non-transitory computer-readable medium may also include one or more of the following features. For instance, the non-transitory computer-readable medium may include code for causing the first UE to receive a synchronization signal; and code for causing the first UE to identify the boundary of the first sidelink frame based on the synchronization signal. The COT indication signal indicates a number of sidelink frames in the COT. The COT indication signal indicates that a last sidelink frame of the COT is shortened to provide an LBT gap. The COT includes a plurality of frequency subbands within the shared radio frequency band, and where the COT indication signal indicates information associated with the plurality of frequency subbands. Each sidelink frame of the COT includes a sidelink resource in each frequency subband of the plurality of frequency subbands, and where each sidelink resource includes a physical sidelink control channel (PSCCH) and a physical sidelink shared channel (PSSCH). The code for causing the first UE to perform the LBT is configured to perform a category 4 LBT aCRoss the plurality of frequency subbands. The plurality of frequency subbands is associated with a LBT subband size in the shared radio frequency band. The shared radio frequency band is a 5 gigahertz (ghz) band, and where the LBT subband size is 20 MHz. The COT indication signal indicates an LBT mode for the UEs to transmit in the one or more sidelink frames. The LBT mode includes at least one of a category 1 LBT or a category 2 LBT. The non-transitory computer-readable medium may include code for causing the first UE to monitor for sidelink control information (SCI) during the first sidelink frame; and the code for causing the first UE to perform the LBT is configured to perform the LBT based on the monitoring. The code for causing the first UE to perform the LBT is configured to perform the LBT in response to a determination that no SCI is detected by the monitoring. The code for causing the first UE to monitor the SCI is configured to detect the SCI indicating a reservation in a frequency subband within the shared radio frequency band; and the code for causing the first UE to perform the LBT is configured to perform the LBT in response to an override of the SCI based on a priority of the reservation. The code for causing the first UE to monitor the SCI is configured to detect the SCI in a frequency subband within the shared radio frequency band; and the code for causing the first UE to perform the LBT is configured to performing the LBT is in response to an override of the SCI based on a number of LBT failures exceeding a threshold. The number of LBT failures is associated with predetermined LBT starting points associated with a sidelink frame boundary. The non-transitory computer-readable medium may include code for causing the first UE to determine an instance for transmitting the COT indication signal based on a channel busy ratio (CBR) value. The CBR value is associated with a plurality of UEs in a geographical area, the plurality of UEs including the non-transitory computer-readable medium. The non-transitory computer-readable medium may include code for causing the first UE to determine an instance for transmitting the COT indication signal based on at least one of a duration of the COT or an LBT parameter associated with the LBT. The non-transitory computer-readable medium may include code for causing the first UE to determine an instance for transmitting the COT indication signal based on a number of LBT failures associated with predetermined LBT starting points. The non-transitory computer-readable medium may include code for causing the first UE to transmit, to a second UE, a sidelink communication during a second sidelink frame of the one or more sidelink frames of the COT. The second sidelink frame is a last sidelink frame of the COT; and the code for causing the first UE to transmit the sidelink communication is configured to transmit, to the second UE, a shortened sidelink communication in the second sidelink frame to provide an LBT gap. The code for causing the first UE to perform the LBT is configured to perform the LBT in one or more frequency subbands within the shared radio frequency band; and the program code further includes code for causing the first UE to transmit a channel access occupancy ratio (CR) report based on a number of frequency subbands of the one or more frequency subbands having an LBT pass.

Further aspects of the present disclosure include a non-transitory computer-readable medium having program code recorded thereon. The non-transitory computer-readable medium includes code for causing a first user equipment (UE) to receive a channel occupancy time (COT) indication signal in a shared radio frequency band, where a beginning of the COT indication signal is within a first sidelink frame and offset from a boundary of the first sidelink frame, and where the COT indication signal indicates one or more sidelink frames subsequent to the first sidelink frame for sharing. The non-transitory computer-readable medium also includes code for causing the first UE to transmit, to a second UE, a first sidelink communication including SCI and sidelink data during a second sidelink frame of the one or more sidelink frames based on the COT indication signal.

The non-transitory computer-readable medium may also include one or more of the following features. For instance, the non-transitory computer-readable medium may include where the COT indication signal indicates a plurality of frequency subbands within the shared radio frequency band; and the code for causing the first UE to transmit the first sidelink communication is configured to transmit, to the second UE, the first sidelink communication in a first frequency subband of the plurality of frequency subbands during the second sidelink frame based on the COT indication signal. The COT indication signal indicates a listen-before-talk (LBT) mode for the one or more sidelink frames. The LBT mode includes at least one of a category 1 LBT or a category 2 LBT. The non-transitory computer-readable medium may include code for causing the first UE to perform an LBT based on the LBT mode before transmitting the first sidelink communication. The COT indication signal indicates a COT including the one or mode sidelink frames and a last sidelink frame of the COT is shortened to provide an LBT gap. The code for causing the first UE to transmit the first sidelink communication is configured to transmit, to the second UE, a shortened sidelink communication in the second sidelink frame based on the second sidelink frame being the last sidelink frame of the COT. An end time of the shortened sidelink communication is based on a priority of the first sidelink communication. An end time of the shortened sidelink communication is based on a channel busy ratio (CBR) value. The non-transitory computer-readable medium may include code for causing the first UE to receive an indication of the CBR value, the CBR value associated with a plurality of UEs in a geographical area, the plurality of UEs including the first UE. The code for causing the first UE to receive the COT indication signal is configured to receive the COT indication signal based on the monitoring. The code for causing the first UE to perform the LBT is configured to perform the LBT based on a sidelink frame boundary.

Further aspects of the present disclosure include an apparatus including means for performing listen-before-talk (LBT) in a shared radio frequency band during at least a portion of a first sidelink frame. The apparatus also includes means for determining a channel occupancy time (COT) in the shared radio frequency band based on the LBT, where a beginning of the COT is within the first sidelink frame and offset from a boundary of the first sidelink frame, and where the COT includes one or more sidelink frames subsequent to the first sidelink frame; and means for transmitting, in the shared radio frequency band, a COT indication signal at the beginning of the COT within the first sidelink frame, where the COT indication signal includes COT sharing information for UEs to share the one or more sidelink frames.

The apparatus may also include one or more of the following features. For instance, the apparatus may include means for receiving a synchronization signal; and means for identifying the boundary of the first sidelink frame based on the synchronization signal. The COT indication signal indicates a number of sidelink frames in the COT. The COT indication signal indicates that a last sidelink frame of the COT is shortened to provide an LBT gap. The COT includes a plurality of frequency subbands within the shared radio frequency band, and where the COT indication signal indicates information associated with the plurality of frequency subbands. Each sidelink frame of the COT includes a sidelink resource in each frequency subband of the plurality of frequency subbands, and where each sidelink resource includes a physical sidelink control channel (PSCCH) and a physical sidelink shared channel (PSSCH). The means for performing the LBT is configured to perform a category 4 LBT aCRoss the plurality of frequency subbands. The plurality of frequency subbands is associated with a LBT subband size in the shared radio frequency band. The shared radio frequency band is a 5 gigahertz (ghz) band, and where the LBT subband size is 20 MHz. The COT indication signal indicates an LBT mode for the UEs to transmit in the one or more sidelink frames. The LBT mode includes at least one of a category 1 LBT or a category 2 LBT. The apparatus may include means for monitoring for sidelink control information (SCI) during the first sidelink frame; and the means for performing the LBT is configured to perform the LBT based on the monitoring. The means for performing the LBT is configured to perform the LBT in response to a determination that no SCI is detected by the monitoring. The means for monitoring the SCI is configured to detect the SCI indicating a reservation in a frequency subband within the shared radio frequency band; and the means for performing the LBT is configured to perform the LBT in response to an override of the SCI based on a priority of the reservation. The means for monitoring the SCI is configured to detect the SCI in a frequency subband within the shared radio frequency band; and the means for performing the LBT is configured to performing the LBT is in response to an override of the SCI based on a number of LBT failures exceeding a threshold. The number of LBT failures is associated with predetermined LBT starting points associated with a sidelink frame boundary. The apparatus may include means for determining an instance for transmitting the COT indication signal based on a channel busy ratio (CBR) value. The CBR value is associated with a plurality of UEs in a geographical area, the plurality of UEs including the apparatus. The apparatus may include means for determining an instance for transmitting the COT indication signal based on at least one of a duration of the COT or an LBT parameter associated with the LBT. The apparatus may include means for determining an instance for transmitting the COT indication signal based on a number of LBT failures associated with predetermined LBT starting points. The apparatus may include means for transmitting, to a second UE, a sidelink communication during a second sidelink frame of the one or more sidelink frames of the COT. The second sidelink frame is a last sidelink frame of the COT; and the means for transmitting the sidelink communication is configured to transmit, to the second UE, a shortened sidelink communication in the second sidelink frame to provide an LBT gap. The means for performing the LBT is configured to perform the LBT in one or more frequency subbands within the shared radio frequency band; and the apparatus further includes means for transmitting a channel access occupancy ratio (CR) report based on a number of frequency subbands of the one or more frequency subbands having an LBT pass.

Further aspects of the present disclosure include an apparatus including means for receiving a channel occupancy time (COT) indication signal in a shared radio frequency band, where a beginning of the COT indication signal is within a first sidelink frame and offset from a boundary of the first sidelink frame, and where the COT indication signal indicates one or more sidelink frames subsequent to the first sidelink frame for sharing. The apparatus also includes means for transmitting, to a second UE, a first sidelink communication including SCI and sidelink data during a second sidelink frame of the one or more sidelink frames based on the COT indication signal.

The apparatus may also include one or more of the following features. For instance, the apparatus may include where the COT indication signal indicates a plurality of frequency subbands within the shared radio frequency band; and the means for transmitting the first sidelink communication is configured to transmit, to the second UE, the first sidelink communication in a first frequency subband of the plurality of frequency subbands during the second sidelink frame based on the COT indication signal. The COT indication signal indicates a listen-before-talk (LBT) mode for the one or more sidelink frames. The LBT mode includes at least one of a category 1 LBT or a category 2 LBT. The apparatus may include means for performing an LBT based on the LBT mode before transmitting the first sidelink communication. The COT indication signal indicates a COT including the one or mode sidelink frames and a last sidelink frame of the COT is shortened to provide an LBT gap. The means for transmitting the first sidelink communication is configured to transmit, to the second UE, a shortened sidelink communication in the second sidelink frame based on the second sidelink frame being the last sidelink frame of the COT. An end time of the shortened sidelink communication is based on a priority of the first sidelink communication. An end time of the shortened sidelink communication is based on a channel busy ratio (CBR) value. The apparatus may include means for receiving an indication of the CBR value, the CBR value associated with a plurality of UEs in a geographical area, the plurality of UEs including the first UE. The means for receiving the COT indication signal is configured to receive the COT indication signal based on the monitoring. The means for performing the LBT is configured to perform the LBT based on a sidelink frame boundary.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication, comprising:
    performing, by a first user equipment (UE), a listen-before-talk (LBT) in a shared radio frequency band during at least a portion of a first sidelink frame;
    determining, by the first UE, a channel occupancy time (COT) in the shared radio frequency band based on the LBT, wherein a beginning of the COT is within the first sidelink frame and offset from a boundary of the first sidelink frame, and wherein the COT includes one or more sidelink frames subsequent to the first sidelink frame; and
    transmitting, by the first UE in the shared radio frequency band, a COT indication signal at the beginning of the COT within the first sidelink frame, wherein the COT indication signal includes COT sharing information for UEs to share the one or more subsequent sidelink frames.

2. The method of claim 1, wherein the COT indication signal indicates a number of sidelink frames in the COT and that a last sidelink frame of the COT is shortened to provide an LBT gap.

3. The method of claim 1, wherein:
    the COT includes a plurality of frequency subbands within the shared radio frequency band;
    the performing the LBT includes:
        performing, by the first UE, a category 4 LBT across the plurality of frequency subbands; and
    the COT indication signal further indicates the COT sharing information associated with the plurality of frequency subbands in the one or more subsequent sidelink frames.

4. The method of claim 1, wherein the COT indication signal indicates an LBT mode for the UEs to transmit in the one or more subsequent sidelink frames, and wherein the LBT mode includes at least one of a category 1 LBT or a category 2 LBT.

5. The method of claim 1, further comprising:
    monitoring, by the first UE, for sidelink control information (SCI) during the first sidelink frame,
    wherein the performing the LBT is in response to a determination that no SCI is detected by the monitoring.

6. The method of claim 1, further comprising:
    detecting, by the first UE, sidelink control information (SCI) indicating a reservation for the first sidelink frame,
    wherein the performing the LBT is in response to an override of the SCI based on at least one of a priority of the reservation or a number of LBT failures exceeding a threshold.

7. The method of claim 1, further comprising:
    determining, by the first UE, an instance for transmitting the COT indication signal based on a channel busy ratio (CBR) value.

8. The method of claim 7, further comprising:
    receiving, by the first UE, an indication of the CBR value, wherein the CBR value is associated with a plurality of UEs in a geographical area, the plurality of UEs including the first UE.

9. The method of claim 1, further comprising:
    determining, by the first UE, an instance for transmitting the COT indication signal based on at least one of a duration of the COT, an LBT parameter associated with the LBT, or a number of LBT failures associated with predetermined LBT starting points.

10. The method of claim 1, further comprising:
    transmitting, by the first UE to a second UE, a sidelink communication during a last sidelink frame of the one or more subsequent sidelink frames of the COT, wherein the sidelink communication is shortened in time to provide an LBT gap, and wherein an end time of the sidelink communication is based on at least one of a priority of the sidelink communication or a channel busy ratio (CBR) value.

11. A method of wireless communication, comprising:
receiving, by a first user equipment (UE), a channel occupancy time (COT) indication signal in a shared radio frequency band, wherein a beginning of the COT indication signal is within a first sidelink frame and offset from a boundary of the first sidelink frame, and wherein the COT indication signal indicates one or more sidelink frames subsequent to the first sidelink frame for sharing; and
transmitting, by the first UE to a second UE, a first sidelink communication including sidelink control information (SCI) and sidelink data during a second sidelink frame of the one or more subsequent sidelink frames based on the COT indication signal.

12. The method of claim 11, wherein:
the COT indication signal indicates a plurality of frequency subbands within the shared radio frequency band; and
the transmitting comprises:
transmitting, by the first UE to the second UE, the first sidelink communication in a first frequency subband of the plurality of frequency subbands during the second sidelink frame based on the COT indication signal.

13. The method of claim 11, wherein the COT indication signal indicates a listen-before-talk (LBT) mode for the one or more subsequent sidelink frames, and wherein the LBT mode includes at least one of a category 1 LBT or a category 2 LBT.

14. The method of claim 11, wherein the COT indication signal indicates a COT including the one or more subsequent sidelink frames and that a last sidelink frame of the COT is shortened to provide an LBT gap.

15. The method of claim 14, wherein the transmitting comprises:
transmitting, by the first UE to the second UE, a shortened sidelink communication in the second sidelink frame based on the second sidelink frame being the last sidelink frame of the COT.

16. The method of claim 15, wherein an end time of the shortened sidelink communication is based on a priority of the first sidelink communication.

17. The method of claim 15, wherein an end time of the shortened sidelink communication is based on a channel busy ratio (CBR) value.

18. The method of claim 17, further comprising:
receiving, by the first UE, an indication of the CBR value, the CBR value associated with a plurality of UEs in a geographical area, the plurality of UEs including the first UE.

19. The method of claim 11, further comprising:
monitoring, by the first UE, for the COT indication signal in the shared radio frequency band; and
performing, by the first UE, a listen-before-talk (LBT) in the shared radio frequency band concurrent with the monitoring,
wherein the receiving the COT indication signal is based on the monitoring.

20. The method of claim 19, wherein the performing the LBT is based on a sidelink frame boundary.

21. An apparatus comprising:
a processor configured to:
perform listen-before-talk (LBT) in a shared radio frequency band during at least a portion of a first sidelink frame; and
determine a channel occupancy time (COT) in the shared radio frequency band based on the LBT, wherein a beginning of the COT is within the first sidelink frame and offset from a boundary of the first sidelink frame, and wherein the COT includes one or more sidelink frames subsequent to the first sidelink frame; and
a transceiver in communication with the processor, the transceiver configured to:
transmit, in the shared radio frequency band, a COT indication signal at the beginning of the COT within the first sidelink frame, wherein the COT indication signal includes COT sharing information for UEs to share the one or more subsequent sidelink frames.

22. The apparatus of claim 21, wherein the COT indication signal indicates a number of sidelink frames in the COT and that a last sidelink frame of the COT is shortened to provide an LBT gap.

23. The apparatus of claim 21, wherein the processor is further configured to:
determine an instance for transmitting the COT indication signal based on a channel busy ratio (CBR) value.

24. The apparatus of claim 23, wherein the transceiver is further configured to:
receive an indication of the CBR value, wherein the CBR value is associated with a plurality of UEs in a geographical area, the plurality of UEs including the apparatus.

25. The apparatus of claim 21, wherein the transceiver is further configured to:
transmit, to a second UE, a sidelink communication during a last sidelink frame of the one or more subsequent sidelink frames of the COT, wherein the sidelink communication is shortened in time to provide an LBT gap, and wherein an end time of the sidelink communication is based on at least one of a priority of the sidelink communication or a channel busy ratio (CBR) value.

26. An apparatus comprising:
a transceiver configured to:
receive a channel occupancy time (COT) indication signal in a shared radio frequency band, wherein a beginning of the COT indication signal is within a first sidelink frame and offset from a boundary of the first sidelink frame, and wherein the COT indication signal indicates one or more sidelink frames subsequent to the first sidelink frame for sharing; and
transmit, to a second UE, a first sidelink communication including sidelink control information (SCI) and sidelink data during a second sidelink frame of the one or more subsequent sidelink frames; and
a processor in communication with the transceiver, the processor configured to:
identify the second sidelink frame of the one or more subsequent sidelink frames based on the COT indication signal.

27. The apparatus of claim 26, wherein:
the COT indication signal indicates a plurality of frequency subbands within the shared radio frequency band; and
the transceiver configured to transmit the first sidelink communication is configured to:
transmit, to the second UE, the first sidelink communication in a first frequency subband of the plurality of frequency subbands during the second sidelink frame based on the COT indication signal.

28. The apparatus of claim 26, wherein the COT indication signal indicates a COT including the one or mode subsequent sidelink frames and that a last sidelink frame of the COT is shortened to provide an LBT gap.

29. The apparatus of claim 26, wherein the transceiver configured to transmit the first sidelink communication is configured to:
   transmit, to the second UE, a shortened sidelink communication in the second sidelink frame based on the second sidelink frame being the last sidelink frame of the COT, wherein an end time of the shortened sidelink communication is based on at least one of a priority of the first sidelink communication or a channel busy ratio (CBR) value.

30. The apparatus of claim 29, wherein:
   the end time of the shortened sidelink communication is based on the CBR value; and
   the transceiver is further configured to:
      receive an indication of the CBR value, the CBR value associated with a plurality of UEs in a geographical area, the plurality of UEs including the first UE.

\* \* \* \* \*